US012804176B2

(12) United States Patent
Yang

(10) Patent No.: US 12,804,176 B2
(45) Date of Patent: Nov. 17, 2026

(54) REDUCED LEAKAGE POWER FOR VIDEO CODEC PARALLEL PROCESSING

(71) Applicant: QUALCOMM Incorporated, San Diego, CA (US)

(72) Inventor: Shengqi Yang, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 18/596,552

(22) Filed: Mar. 5, 2024

(65) Prior Publication Data

US 2025/0287027 A1 Sep. 11, 2025

(51) Int. Cl.
*H04N 19/436* (2014.01)

(52) U.S. Cl.
CPC .................................. *H04N 19/436* (2014.11)

(58) Field of Classification Search
CPC ....... H04N 19/436; G06F 1/32; G06F 1/3234; G06F 1/3287
See application file for complete search history.

(56) References Cited

U.S. PATENT DOCUMENTS 6,301,671 B1 10/2001 Boice et al.
10,572,824 B2 * 2/2020 Chamberlain .......... G06F 21/85
2008/0063085 A1 * 3/2008 Wu ...................... H04N 19/117 375/240.26
2009/0001814 A1 1/2009 Subramaniam
2012/0117358 A1 5/2012 Dockser
2012/0287337 A1 * 11/2012 Kumar ...................... G06T 7/20 348/E3.047
2013/0198549 A1 8/2013 Longnecker et al.
2014/0192898 A1 * 7/2014 Zhang .................... H04N 19/46 375/240.26
2014/0198858 A1 7/2014 Wu et al.
(Continued)

FOREIGN PATENT DOCUMENTS

EP 3258691 A1 12/2017
WO WO-2022231867 A1 * 11/2022 ............... G09G 5/14

OTHER PUBLICATIONS

International Search Report and Written Opinion—PCT/US2025/017076—ISA/EPO—May 13, 2025.
(Continued)

*Primary Examiner* — Peet Dhillon
(74) *Attorney, Agent, or Firm* — QUALCOMM Incorporated; Espartaco Diaz Hidalgo

(57) ABSTRACT

Systems and techniques are provided for processing video data. A process can include obtaining a frame of video data associated with a plurality of Largest Coding Unit (LCU) rows and a plurality of LCU columns, and processing the frame of video data using a plurality of parallel processing pipelines, wherein each pipeline of the plurality of parallel processing pipelines is configured to process a corresponding subset of LCU rows of the plurality of LCU rows. An interrupt signal can be received from a particular pipeline of the plurality of parallel processing pipelines, indicating the particular pipeline has completed processing of a respective last LCU of the corresponding subset of LCU rows. A shut down of the particular pipeline can be caused based on receipt of the interrupt signal from the particular pipeline, wherein the shut down deactivates the particular pipeline.

20 Claims, 11 Drawing Sheets

(56) References Cited

U.S. PATENT DOCUMENTS

| | | | | |
|---|---|---|---|---|
| 2016/0065969 | A1* | 3/2016 | Cheng | G06F 9/4818 375/240.24 |
| 2017/0160781 | A1* | 6/2017 | Piga | G06F 1/3287 |
| 2017/0180730 | A1* | 6/2017 | Yatabe | H04N 19/61 |
| 2017/0251218 | A1* | 8/2017 | Chiu | H04N 19/436 |
| 2019/0068974 | A1* | 2/2019 | Pohl | G09G 5/001 |
| 2021/0125664 | A1* | 4/2021 | Holland | G06F 1/3287 |
| 2022/0264130 | A1 | 8/2022 | Bruns et al. | |

OTHER PUBLICATIONS

Wang Z., et al., "Dynamic Macroblock Wavefront Parallelism for Parallel Video Coding", Journal of Visual Communication and Image Representation, Academic Press, Inc, US, vol. 28, Jan. 17, 2015, pp. 36-43, XP029143858, sections 1 and 2, figure 1.

* cited by examiner

| | | Col 0 | Col 1 | Col 2 | Col 3 | Col 4 | Col 5 | Col 6 | Col 7 | Col 8 | Col 9 | Col 10 | Col 11 | Col 12 | Col 13 | Col 14 |
|---|---|---|---|---|---|---|---|---|---|---|---|---|---|---|---|---|
| Row 0 | Pipe 0 | 0 | 1 | 2 | 3 | 4 | 5 | 6 | 7 | 8 | 9 | 10 | 11 | 12 | 13 | 14 |
| Row 1 | Pipe 1 | 2 | 3 | 4 | 5 | 6 | 7 | 8 | 9 | 10 | 11 | 12 | 13 | 14 | 15 | 16 |
| Row 2 | Pipe 2 | 4 | 5 | 6 | 7 | 8 | 9 | 10 | 11 | 12 | 13 | 14 | 15 | 16 | 17 | 18 |
| Row 3 | Pipe 3 | 6 | 7 | 8 | 9 | 10 | 11 | 12 | 13 | 14 | 15 | 16 | 17 | 18 | 19 | 20 |
| Row 4 | Pipe 0 | 15 | 16 | 17 | 18 | 19 | 20 | 21 | 22 | 23 | 24 | 25 | 26 | 27 | 28 | 29 |
| Row 5 | Pipe 1 | 17 | 18 | 19 | 20 | 21 | 22 | 23 | 24 | 25 | 26 | 27 | 28 | 29 | 30 | 31 |
| Row 6 | Pipe 2 | 19 | 20 | 21 | 22 | 23 | 24 | 25 | 26 | 27 | 28 | 29 | 30 | 31 | 32 | 33 |
| Row 7 | Pipe 3 | 21 | 22 | 23 | 24 | 25 | 26 | 27 | 28 | 29 | 30 | 31 | 32 | 33 | 34 | 35 |
| Row 8 | Pipe 0 | 30 | 31 | 32 | 33 | 34 | 35 | 36 | 37 | 38 | 39 | 40 | 41 | 42 | 43 | 44 |

REDUCED LEAKAGE POWER FOR VIDEO CODEC PARALLEL PROCESSING

FIELD

The present disclosure generally relates to video processing. For example, aspects of the present disclosure relate to systems and techniques for improving video coding techniques (e.g., encoding and/or decoding video) with respect to leakage power associated with parallel processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called “smart phones,” video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding techniques with better coding efficiency are needed.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described herein for improved video processing, such as video encoding and/or decoding. For example, a system can provide an interrupt indicative of an idle state of a particular video codec parallel processing element, and the particular video codec parallel processing element can be shut down while waiting for processing of a current frame to be completed by one or more different video codec parallel processing elements. According to at least one example, an apparatus for processing video data is provided. The apparatus includes at least one memory and at least one processor coupled to the at least one memory and configured to: obtain a frame of video data, wherein the frame of video data is associated with a plurality of Largest Coding Unit (LCU) rows and a plurality of LCU columns; process the frame of video data using a plurality of parallel processing pipelines, wherein each pipeline of the plurality of parallel processing pipelines is configured to process a corresponding subset of LCU rows of the plurality of LCU rows; receive an interrupt signal from a particular pipeline of the plurality of parallel processing pipelines, wherein the interrupt signal indicates the particular pipeline has completed processing of a respective last LCU of the corresponding subset of LCU rows; and cause a shut down of the particular pipeline based on receipt of the interrupt signal from the particular pipeline, wherein the shut down deactivates the particular pipeline.

In another example, a method for processing video data is provided. The method includes: obtaining a frame of video data, wherein the frame of video data is associated with a plurality of Largest Coding Unit (LCU) rows and a plurality of LCU columns; processing the frame of video data using a plurality of parallel processing pipelines, wherein each pipeline of the plurality of parallel processing pipelines is configured to process a corresponding subset of LCU rows of the plurality of LCU rows; receiving an interrupt signal from a particular pipeline of the plurality of parallel processing pipelines, wherein the interrupt signal indicates the particular pipeline has completed processing of a respective last LCU of the corresponding subset of LCU rows; and causing a shut down of the particular pipeline based on receipt of the interrupt signal from the particular pipeline, wherein the shut down deactivates the particular pipeline.

In another example, a non-transitory computer-readable medium is provided that includes instructions that, when executed by at least one processor, cause the at least one processor to: obtain a frame of video data, wherein the frame of video data is associated with a plurality of Largest Coding Unit (LCU) rows and a plurality of LCU columns; process the frame of video data using a plurality of parallel processing pipelines, wherein each pipeline of the plurality of parallel processing pipelines is configured to process a corresponding subset of LCU rows of the plurality of LCU rows; receive an interrupt signal from a particular pipeline of the plurality of parallel processing pipelines, wherein the interrupt signal indicates the particular pipeline has completed processing of a respective last LCU of the corresponding subset of LCU rows; and cause a shut down of the particular pipeline based on receipt of the interrupt signal from the particular pipeline, wherein the shut down deactivates the particular pipeline.

In another example, an apparatus for processing video data is provided. The apparatus includes: means for obtaining a frame of video data, wherein the frame of video data is associated with a plurality of Largest Coding Unit (LCU) rows and a plurality of LCU columns; means for processing the frame of video data using a plurality of parallel processing pipelines, wherein each pipeline of the plurality of parallel processing pipelines is configured to process a corresponding subset of LCU rows of the plurality of LCU rows; means for receiving an interrupt signal from a particular pipeline of the plurality of parallel processing pipelines, wherein the interrupt signal indicates the particular pipeline has completed processing of a respective last LCU of the corresponding subset of LCU rows; and means for causing a shut down of the particular pipeline based on receipt of the interrupt signal from the particular pipeline, wherein the shut down deactivates the particular pipeline.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
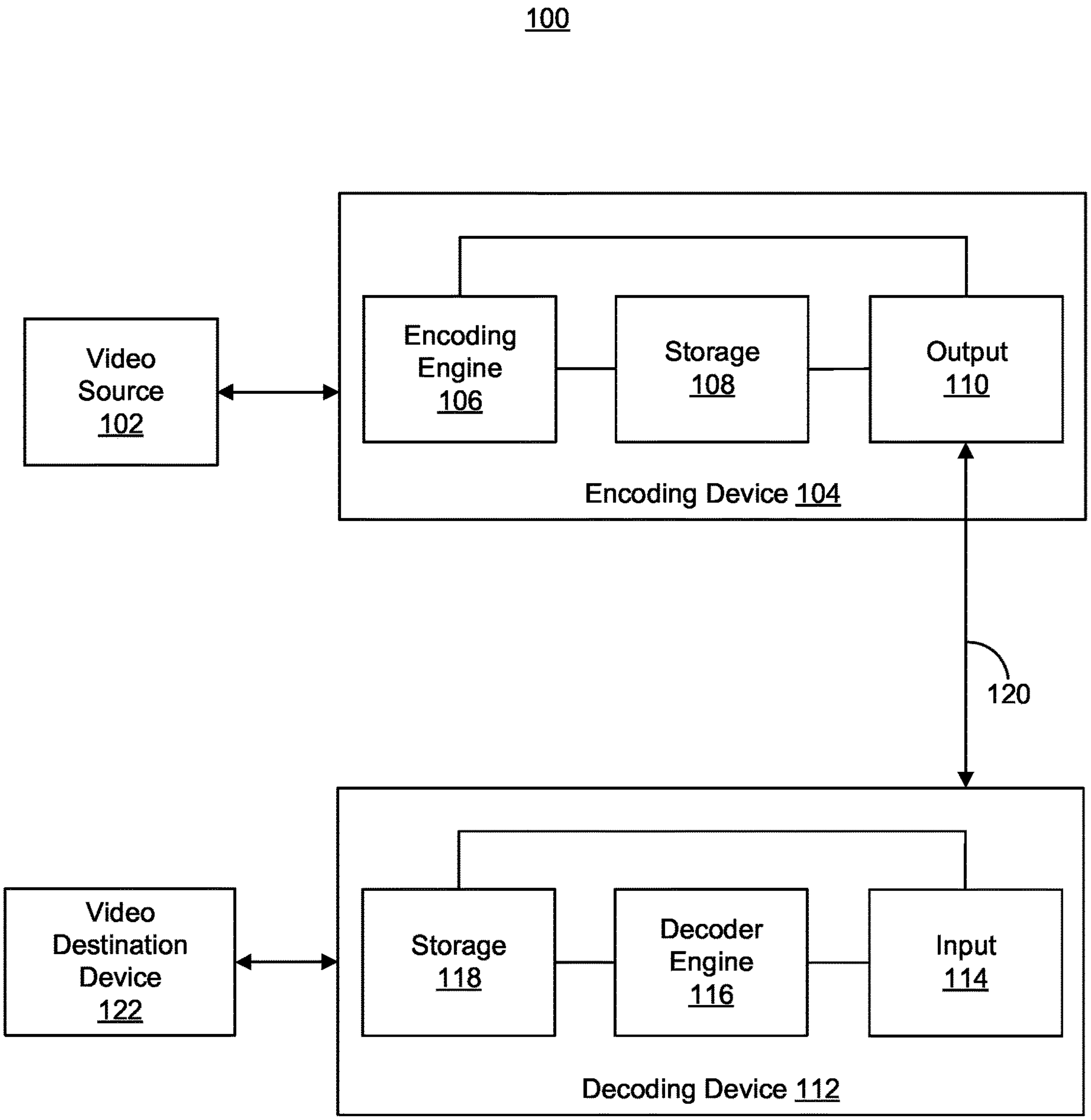
FIG. 1 is a block diagram illustrating an example of an encoding device and a decoding device, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy encode the quantized transform coefficients and/or the syntax elements, thereby further reducing the number of bits needed for their representation.

After entropy decoding and de-quantizing the received bitstream, a video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As used herein, a "video codec" may be used to refer to software or hardware that compresses and/or decompresses digital video data. For example, a video codec can be used to compress raw video data to reduce file size for storage or transmission, and/or to decompress the video file for playback. Compressing video data may also referred to as "encoding" video data. Decompressing video data may also be referred to as "decoding" video data. A video codec IP core can be implemented as a dedicated hardware logic block that is designed for the efficient encoding and decoding (e.g., compression and decompression) of video streams or various other forms of video data. For example, a video codec IP core can be used to perform efficient encoding and decoding operations, and can reduce the power consumption and silicon area needed on-device. The IP core of a video codec IP core can refer to a reusable unit of hardware logic (e.g., a hardware processing block, element, sub-system, etc.) that may be implemented in an integrated circuit, system-on-a-chip (SoC), or other circuitry within a computing device or other apparatus configured to perform video coding. For instance, video codec IP cores can be included in digital video processing systems, and can be integrated into various computing devices such as smartphones, televisions, cameras, etc.

Video coding can be performed according to a particular video coding standard. Examples of video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual, Advanced Video Coding (AVC) or ITU-T H.264, including its Scalable Video Coding (SVC) and Multiview Video Coding (MVC) extensions, High Efficiency Video Coding (HEVC) or ITU-T H.265, including its range and screen content coding, 3D video coding (3D-HEVC), multiview (MV-HEVC), and scalable (SHVC) extensions, Versatile Video Coding (VVC) or ITU-T H.266 and its extensions, VP9, Alliance of Open Media (AOMedia) Video 1 (AV1), Essential Video Coding (EVC), among others. Newer generations of video codecs may provide greater compression efficiency, improved video quality, and/or support for higher resolutions and frame rates, etc. For example, more recent video codecs such as HEVC, VP9, VVC, and AV1 can implement more efficient compression that may be used to support applications such as 4K and 8K streaming, etc.

As video coding and video codecs advance to support higher resolutions and frame rates of the video data being encoded and decoded, video codec parallel processing may be utilized. For example, video codec IP cores can implement a plurality of parallel processing pipelines (e.g., also referred to as "pipes") for parallel encoding and/or decoding of video data. In video codec parallel processing, the task of encoding or decoding video can be divided into smaller, parallel tasks that can be processed simultaneously (e.g., each parallel task can be performed using a corresponding one of the parallel pipes). Distributing a video coding or video processing workload across multiple parallel pipes can reduce an overall processing time for encoding or decoding, and can be used to support higher resolutions of video data, real-time and/or streaming video, etc.

In some examples, each parallel processing pipeline can perform video pixel operations such as motion estimation, motion compensation, transform and quantization, image deblocking, and/or any other video pixel operations. The parallel processing pipelines (and/or each individual processing pipeline) can perform specific video pixel operations in parallel. For example, each processing pipeline can perform multiple operations (and/or process data) simultaneously and/or significantly in parallel. As another example, multiple processing pipelines can perform operations (and/or process data) simultaneously and/or significantly in parallel.

As video codecs advance to support higher resolutions and frame rates of the video data being encoded and decoded, there is a need for improved power management for video coding hardware architectures and/or for video coding operations. For example, there is a need for improved power management for video codec cores and other video codec parallel processing architectures. Video coding can be associated with dynamic power and leakage power.

Dynamic power can represent the power used for processing video data (e.g., the power used by a video codec core when actively encoding or decoding video data). Leakage power can represent power that is consumed by the video codec core, but not directly used for processing the video data. For example, leakage power can be divided into active leakage power (e.g., active leakage while the hardware is actively processing video) and non-active leakage power (e.g., leakage while the hardware is idle). As semiconductor design moves towards smaller technology nodes (e.g., such as 4 nanometer (nm), 3 nm, 2 nm, etc.), leakage power may comprise a larger portion of the total power consumption of various video codec cores and/or parallel processing architectures, for example utilizing greater than 25% of the total core power. There is a need for systems and techniques that can be used to reduce leakage power associated with video codec cores, in both absolute leakage power and percentage of total core power consumption.

Various video codecs may utilize larger Coding Tree Units (CTUs) and/or may have a larger Largest Coding Unit (LCU) size. Larger LCU sizes can be associated with increasing complexity in balancing video codec workloads in parallel processing architectures. For example, H264 uses an LCU size of 16×16 pixels, while video codecs such as HEVC, VP9, and AV1/VVC use larger LCU sizes up to 128×128 pixels. To process the high pixel throughput associated with ultra-high-resolution content (e.g., such as 8K UHD at 60 frames per second (fps) or 4K UHD at 240 fps, etc.), video codec IP core blocks may utilize parallel processing elements (e.g., such as wavefront processing), with multiple processing pipelines configured to provide increased throughput for higher resolutions and/or higher frame rates.

Larger LCU sizes can be associated with unbalanced workloads in a video codec parallel processing architecture. Workload imbalance across the parallel processing elements (e.g., parallel processing pipelines, or parallel pipes) of a video codec core can be associated with increased leakage power consumption, as one or more pipes remain powered on while in an idle state and consume non-active leakage power during the workload imbalance condition.

Systems, apparatuses, processes (also referred to as methods), and computer-readable media (collectively referred to as "systems and techniques") are described herein that can be used to perform video coding (e.g., encoding and/or decoding video data) with reduced leakage power. For example, the systems and techniques can be used to provide a low-leakage architecture for video codec parallel encoding and/or decoding. In some aspects, the systems and techniques can be configured to reduce the non-active leakage power associated with one or more parallel processing elements (PEs, also referred to as parallel processing pipelines or "pipes"), based on shutting down pipes that enter an idle state while waiting for processing of a current frame of video data to continue or be completed.

For example, pipes can be shut down (e.g., powered off) based on determining that a respective pipe has completed processing the last LCU of a row of LCUs currently assigned to the respective pipe for a frame of video data. Based on determining that there are no remaining unprocessed rows of LCUs that can be assigned to the respective pipe (e.g., all LCU rows of the frame of video data have completed processing or are currently being processed by another pipe), the respective pipe can be shut down for at least a remaining processing time of the current frame of video data. For example, when a particular pipe completes processing of a currently assigned row of LCUs, and will not be assigned any additional LCUs or rows of LCUs to process for the current frame, the particular pipe can be fully powered down for the remainder of the frame processing for the current frame. Shutting down the pipe can prevent the non-active leakage power that would otherwise be consumed by the pipe remaining in an idle state (e.g., powered on and not processing an LCU or other video data). In some aspects, shutting down pipes that have been identified as having completed LCU processing for the remainder of the current frame can reduce or eliminate the non-active leakage power consumption of the video coding architecture or core. For example, the systems and techniques can be used to provide a video coding architecture or video coding core with a total power consumption comprising dynamic power and active leakage power (e.g., with zero or near zero non-active leakage power).

In some aspects, each parallel processing pipeline of a plurality of parallel processing pipelines (e.g., each pipe of a plurality of pipes) included in a video codec parallel processing architecture can be configured to implement an interrupt signal that is indicative of the pipe completing processing of a last LCU of a row of LCUs included in a current frame of video data. For example, a pipe can be configured to raise the interrupt based on the pipe completing processing of the last LCU of the last row of LCUs assigned to the pipe for the current frame. In some cases, the interrupt signal can be a "Last_LCU_Row_Done" interrupt signal, among various other interrupt signals that can be used to indicate that the corresponding pipe has completed processing of its last LCU row for the current frame of video data (e.g., has completed processing of the last LCU of a plurality of LCUs included in the last LCU row assigned or allocated to the pipe for encoding or decoding the current frame of video data).

In some cases, the interrupt signal can be transmitted by a respective pipe to a video coding firmware associated with or included in the video codec parallel processing architecture (e.g., the interrupt signal can be received by the video coding firmware from a respective pipe). Each pipe can be associated with a corresponding individually controllable power supply. For example, each pipe of the plurality of pipes can be separately and/or independently configured in a powered on or active state, and a powered off or shut down state. In some examples, the interrupt signal can be received and used by the video coding firmware to configure the shutdown state for the respective pipe that raised the interrupt signal.

The reduced leakage power video coding systems and techniques described herein can reduce the total power consumption and increased the efficiency of encoding and/or decoding video data. Reduced power consumption and increased efficiency can be useful and in some cases necessary for certain applications, such as extended reality (XR) applications (e.g., a virtual reality (VR), augmented reality (AR), mixed reality (MR), etc.), vehicle applications, robotics applications, mobile applications (e.g., media streaming for mobile devices), among others.

Further aspects of the systems and techniques will be described with reference to the figures.

As noted above, the systems and techniques described herein can be applied to any of the existing video codecs, such as Versatile Video Coding (VVC), High Efficiency Video Coding (HEVC), Advanced Video Coding (AVC), Essential Video Coding (EVC), VP9, the AV1 format/codec, and/or other video coding standard, codec, format, etc. in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, the system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The systems and techniques described herein can be applied to any of the existing video codecs (e.g., VVC, HEVC, AVC, or other suitable existing video codec), and/or can be an efficient coding tool for any video coding standards being developed and/or future video coding standards. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AVI, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random-access point picture in the base layer and with certain properties up to and not including a next AU that has a random-access point picture in the base layer and with certain properties. For example, the certain properties of a random-access point picture that starts a CVS may include a RASL flag (e.g., NoRaslOutputFlag) equal to 1. Otherwise, a random-access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and the decoder engine 116 (described in more detail below) may be configured to operate according to VVC. According to VVC, a video coder (such as the encoder engine 106 and/or the decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoder engine 104 and decoder engine 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoder engine 104 may further partition a superblock into smaller coding blocks. Encoder engine 104 may partition a superblock and other coding blocks into smaller blocks using square or non-square partitioning. Non-square blocks may include N/2×N, N×N/2, N/4×N, and N×N/4 blocks. Encoder engine 104 and decoder engine 112 may perform separate prediction and transform processes on each of the coding blocks.

AV1 also defines a tile of video data. A tile is a rectangular array of superblocks that may be coded independently of other tiles. That is, encoder engine 104 and decoder engine 112 may encode and decode, respectively, coding blocks within a tile without using video data from other tiles. However, encoder engine 104 and decoder engine 112 may perform filtering across tile boundaries. Tiles may be uniform or non-uniform in size. Tile-based coding may enable parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There is a plurality of intra-prediction modes (also referred to as "intra modes"). In some examples, the intra prediction of a luma block includes 35 modes, including the Planar mode, DC mode, and 33 angular modes (e.g., diagonal intra-prediction modes and angular modes adjacent to the diagonal intra-prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra-prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a current block of image samples. Using a translational motion model, the position of a block in a previously decoded picture (a reference picture) is indicated by a motion vector (Δx, Δy), with Δx specifying the horizontal displacement and Δy specifying the vertical displacement of the reference block relative to the position of the current block. In some cases, a motion vector (Δx, Δy) can be in integer sample accuracy (also referred to as integer accuracy), in which case the motion vector points to the integer-pel grid (or integer-pixel sampling grid) of the reference frame. In some cases, a motion vector (Δx, Δy) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoding device 104 using a motion estimation process.

With inter-prediction using uni-prediction (also referred to as uni-directional inter-prediction), one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples, following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communication link 120 to the decoding device 112 of the receiving device. The input 114 of the decoding device 112 may receive the NAL units. The communication link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi, radio frequency (RF), UWB, WiFi-Direct, cellular, Long-Term Evolution (LTE), WiMax, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in a storage 108. The output 110 may retrieve the encoded video bitstream data from the encoder engine 106 or from the storage 108. The storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection, and may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to the storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

An example of specific details of the encoding device 104 is described below with reference to FIG. 2. An example of specific details of the decoding device 112 is described below with reference to FIG. 3.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. In some examples, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

This disclosure may generally refer to “signaling” certain information, such as syntax elements. The term “signaling” may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

Figure 2:
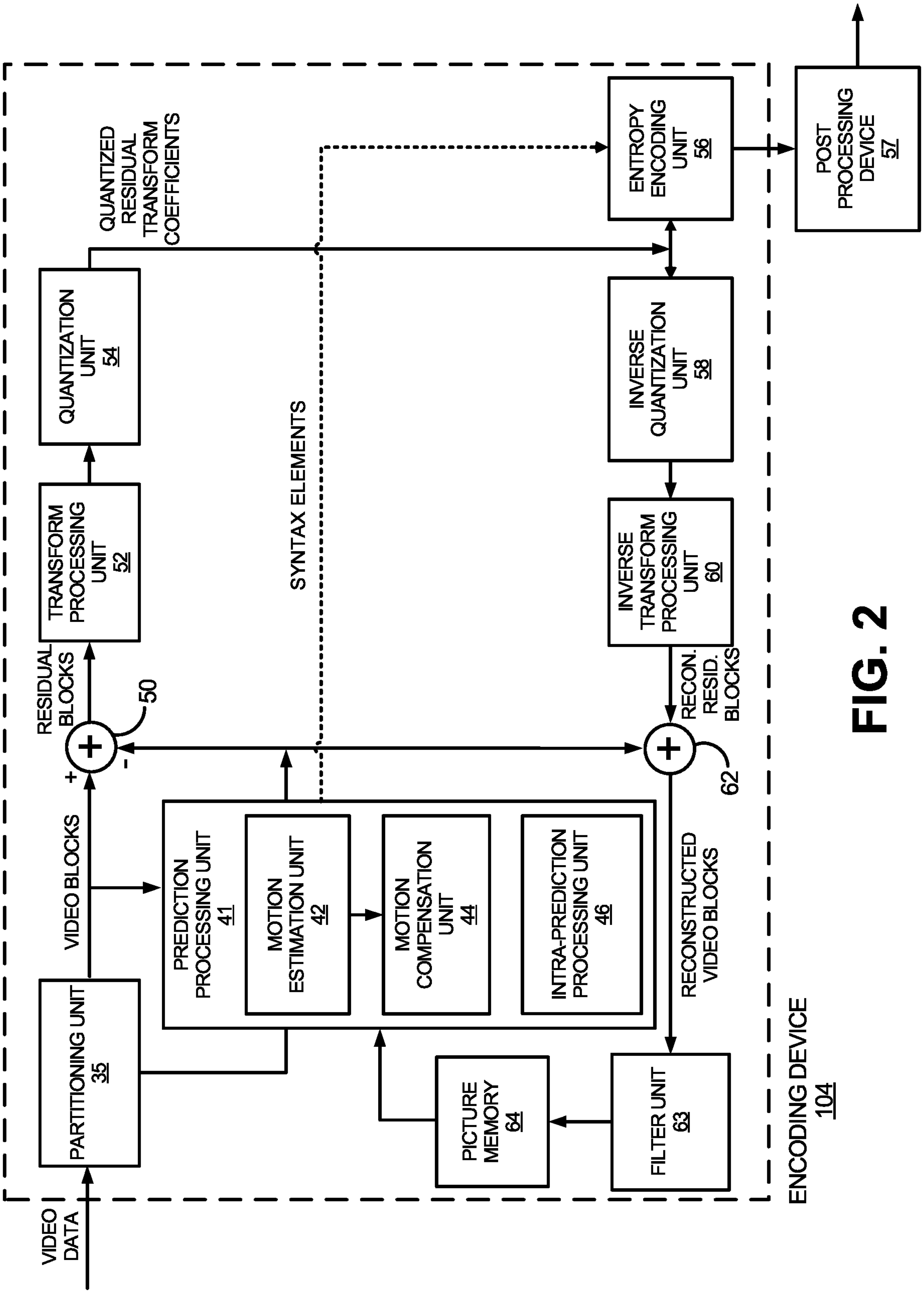
FIG. 2 is a block diagram illustrating an example video encoding device, in accordance with some examples.
Figure 3:
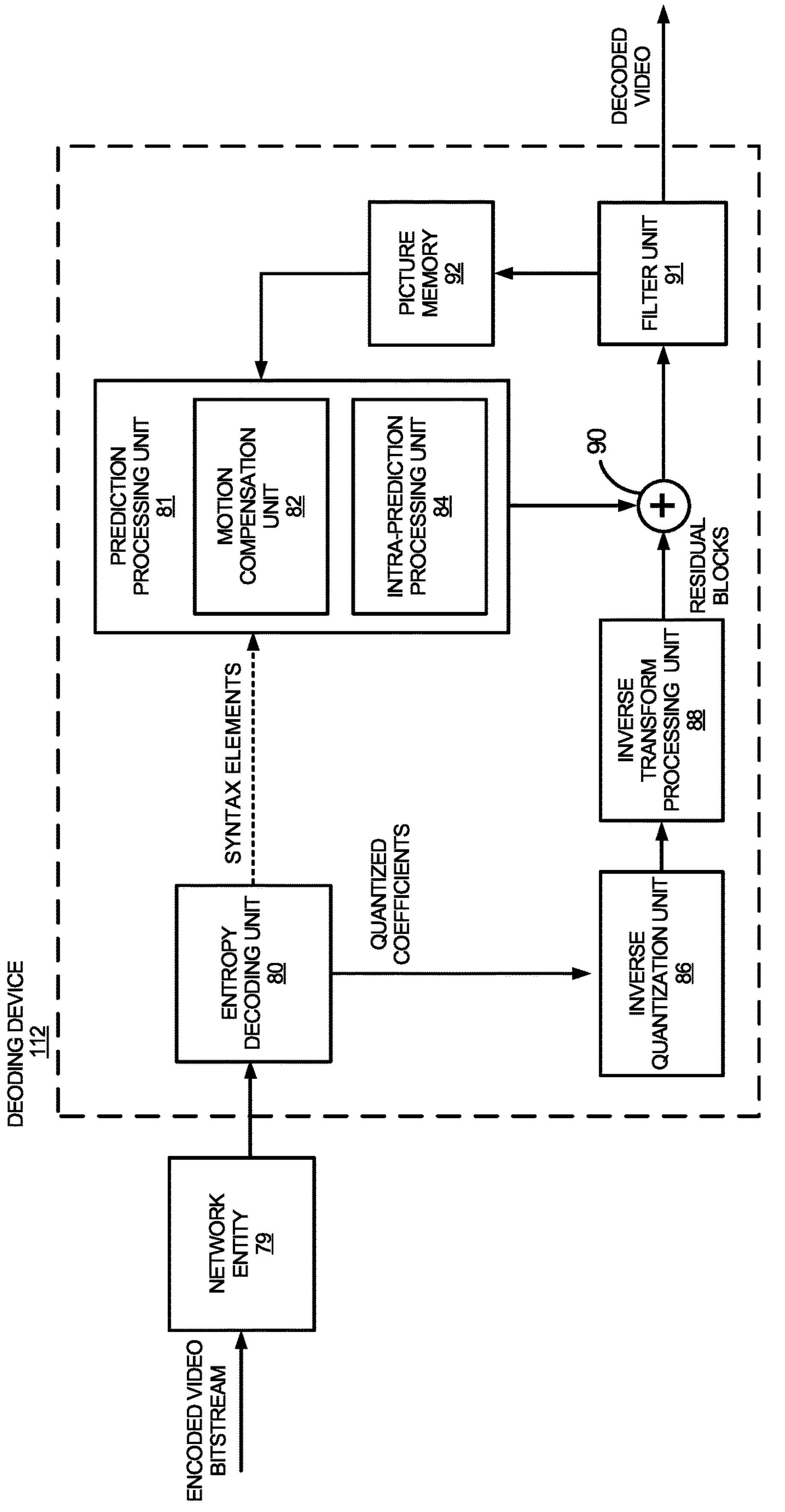
FIG. 3 is a block diagram illustrating an example video decoding device, in accordance with some examples.

Specific details of the encoding device 104 and the decoding device 112 are shown in FIG. 2 and FIG. 3, respectively. FIG. 2 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 3 as being an in-loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 2, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs (e.g., CTUs) and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 2 represents an example of a video encoder configured to perform the techniques described herein. For instance, the encoding device 104 may perform any of the techniques described herein, including the processes described herein. In some cases, some of the techniques of this disclosure may also be implemented by post processing device 57.

FIG. 3 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 2.

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 3 represents an example of a video decoder configured to perform the techniques described herein. For instance, the decoding device 112 may perform any of the techniques described herein, including the processes described herein.

Figure 4:
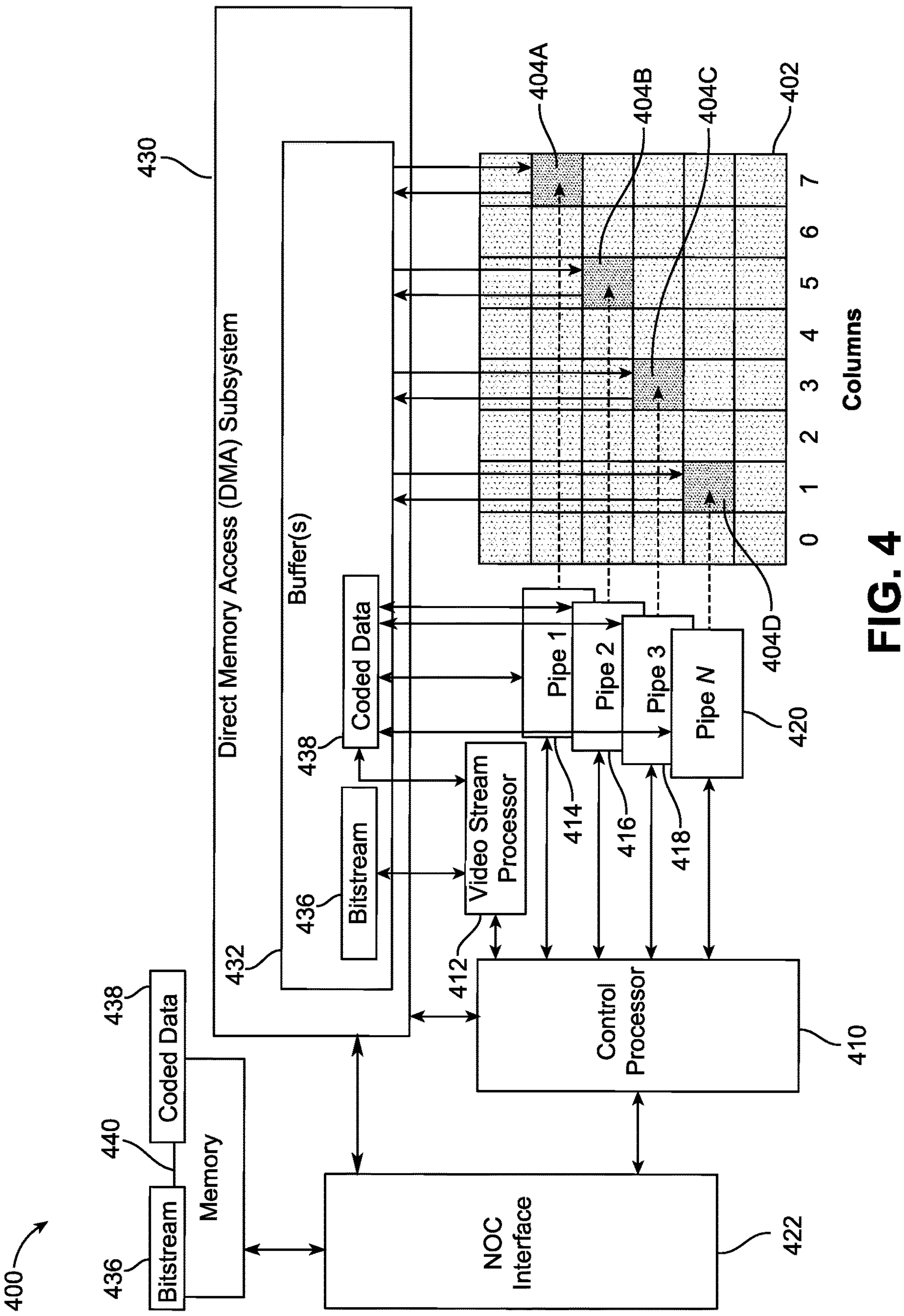
FIG. 4 is a block diagram illustrating an example architecture of a video coding hardware engine, in accordance with some examples.

FIG. 4 is a block diagram illustrating an example architecture 400 of a video coding hardware engine that can be used to perform video coding operations (e.g., encoding and/or decoding of video data). For example, the example architecture 400 of the video coding hardware engine can be used to implement a video encoding engine, a video decoding engine, or both. In some cases, the architecture 400 can be implemented by the encoding device 104 and/or decoding device 112 shown in FIG. 1. In some examples, the architecture 400 can be implemented by the encoder engine 106 of the encoding device 104 or by the decoder engine 116 of the decoding device 112, as shown in FIG. 1.

In this example, the architecture 400 of the video coding hardware engine can include a control processor 410, an interface 422, a video stream processor (VSP) 412, processing pipelines 414-420 (also referred to as "pipes"), a direct memory access (DMA) subsystem 430, and one or more buffers 432. In some examples, the architecture 400 can include memory 440 for storing data such as frames, videos, coding information, outputs, etc. In other examples, the memory 440 can be external memory on the coding device implementing the video coding hardware engine.

The interface 422 can transfer data between components of the video coding hardware engine and/or the video coding device through a communication system or system bus on the video coding hardware engine and/or the coding device implementing the video coding hardware engine. For example, the interface 422 can connect the control processor 410, VSP 412, processing pipelines 414-420 (e.g., video pixel processor (VPP)), DMA subsystem 430, and/or one or more buffers 432 with a system bus on the video coding hardware engine and/or the coding device. In some examples, the interface 422 can include a network-based communications subsystem, such as a network-on-chip (NoC). In some examples, the interface 422 (e.g., NoC, etc.) can be implemented or provided between DDR memory and the DMA 430 (and/or a control processor thereof). For example, in some cases the DMA 430 may access the memory 440 through the interface 422. DDR memory traffic (e.g., from memory 440) can pass through the NoC (e.g., interface 422), followed by the DMA subsystem 430, before being passed to one or more video IP blocks of the video coding architecture 400 (e.g., where the one or more video IP blocks are associated with at least the processing pipelines 414-420). The control processor associated with and/or included within the DMA subsystem 430 can communicate directly with the NoC and can thereby communicate indirectly with the DDR memory (e.g., communicate indirectly with memory 440 through the interface 422).

In some cases, the bitstream 436 information and/or the coded data 438 may be stored in the one or more buffers 432, which may be implemented as on-chip memory within (e.g., included in) the DMA subsystem 430. In some examples, the bitstream 436 and/or the coded data 438 may be included in the one or more buffers 432, which may be implemented as on-chip memory that is outside of (e.g., not included in) the DMA subsystem 430 and inside of (e.g., included in) the video coding engine 400. In some examples, the bitstream 436 and/or the coded data 438 can be stored in DDR memory of the video coding engine 400. For example, the bitstream 436 and/or the coded data 438 can be stored in the memory 440 of the video coding engine 400, which may be implemented as DDR memory, etc. In some cases where the bitstream 436 and/or the coded data 438 are stored in the on-chip memory (e.g., the one or more buffers 432), the DDR request bandwidth of the video coding engine 400 can be reduced. Storing the bitstream 436 and/or the coded data 438 in the on-chip memory (e.g., buffer(s) 432) may additionally reduce the read/write latency of the video coding engine 400.

The DMA subsystem 430 can allow other components of the video coding hardware engine (e.g., other components in the architecture 400) to access memory on the video coding hardware engine and/or the video coding device implementing the video coding hardware engine. For example, the DMA subsystem 430 can provide access to the memory 440 and/or the one or more buffers 432. In some examples, the DMA subsystem 430 can manage access to common memory units and associated data traffic (e.g., tile 402, blocks 404A-D, bitstream 436, entropy coded data 438, etc.).

The memory 440 can include one or more internal or external memory devices such as, for example and without limitation, one or more random access memory (RAM) components, read-only memory (ROM) components, cache memory components, buffer components, and/or other memory devices. The memory 440 can store data used by the video coding hardware engine and/or the video coding device, such as frames, processing parameters, input data, output data, and/or any other type of data.

The control processor 410 can include one or more processors. The control processor 410 can control and/or program components of the video coding hardware engine (e.g., other components in the architecture 400). In some examples, the control processor 410 can interface with other drivers, applications, and/or components that are not shown in FIG. 4. For example, in some cases, the control processor 410 can interface with an application processor on an SOC chip (e.g., which can include a video subsystem, one or more CPUs, one or more GPUs, camera, display, audio, modem, etc.).. For example, the control processor 410 can be included in a video coding subsystem of an SOC of a mobile computing device, smartphone, handset, etc., where the video coding subsystem can include the control processor 410 and a video coding hardware engine, etc., (e.g., a video coding hardware engine according to the video coding engine architecture 400 of FIG. 4, and/or VSP, VPP, etc.).

The VSP 412 can perform bitstream parsing (e.g., separating a network abstraction layer, a picture layer, and a slice layer) and entropy coding operations. In some examples, the VSP 412 can perform coding functions such as variable length encoding or decoding. For example, the VSP 412 can implement a lossless compression and/or decompression algorithm to compress or decompress a bitstream 436. In some examples, the VSP 412 can perform arithmetic coding, such as context, adaptive binary arithmetic coding (CABAC), and/or any other coding algorithm.

The processing pipelines 414-420 can perform video pixel operations such as motion estimation, motion compensation, transform and quantization, image deblocking, and/or any other video pixel operations. In some cases, the processing pipelines 414-420 may perform video pixel operations based on output and/or input of the VSP 412 (e.g., based on the video coding engine 400 being configured or used to implement video encoding and/or decoding operations). In some cases, output of one VSP 412 may be processed by multiple processing pipelines 414-420. The processing pipelines 414-420 (and/or each individual processing pipeline) can perform specific video pixel operations in parallel. For example, each processing pipeline can perform multiple operations (and/or process data) simultaneously and/or significantly in parallel. As another example, multiple processing pipelines can perform operations (and/or process data) simultaneously and/or significantly in parallel.

In FIG. 4, the processing pipelines 414-420 can store and retrieve video pixel processing data (e.g., video pixel processing outputs, inputs, parameters, pixel data, processing synchronization data, etc.) to and from the one or more buffers 432. In some cases, the one or more buffers 432 can include a single buffer. In other cases, the one or more buffers 432 can include multiple buffers. In some examples, the one or more buffers 432 can include a global input/output line buffer and a pipeline synchronization buffer. In some cases, the pipeline synchronization buffer can temporarily store data used to synchronize data and/or results from video pixel processing operations performed by the processing pipelines 414-420.

In some examples, the VSP 412 can decompress a bitstream 436 associated with a video or sequence of frames, and store coded data 438 (e.g., encoded data in examples where the video coding engine 400 is used to implement a video encoder and/or video encoding operations, decoded data in examples where the video coding engine 400 is used to implement a video decoder and/or video decoding operations) associated with the bitstream 436 for processing by the processing pipelines 414-420. In some cases, the coded data 438 may be stored in a memory or buffer and this memory or buffer may be a part of, or separate from buffer 432. In some cases, the VSP 412 can retrieve the bitstream 436 and store the coded data 438 to and from memory using the DMA subsystem 430, which can manage access to memory components and/or units as previously noted. In some cases, the VSP 412 may store the decoded data in an order based on the bitstream. For example, where the bitstream organizes image information based on tiles, the decoded data may be grouped such that decoded data for a tile is stored together, in an order that the tiles are decoded (e.g., in tile order, also referred to as bitstream order). The processing pipelines 414-420 can retrieve the coded data 438 (e.g., via the DMA subsystem 430) and perform video pixel processing operations on blocks 404A-D of a tile 402 associated with the bitstream 436.

The processing pipelines 414-420 can perform video pixel processing operations in parallel, as previously described. The processing pipelines 414-420 can retrieve and store video pixel processing inputs and outputs from/in the one or more buffers 432 (e.g., via DMA subsystem 430). For example, a motion estimation algorithm implemented by the processing pipeline 414 can perform motion estimation on block 404A and store motion estimation information calculated for block 404A in the one or more buffers 432. A motion compensation algorithm implemented by the processing pipeline 414 can retrieve the motion estimation information from the one or more buffers 432, and use the motion estimation information to perform motion compensation for block 404A. While the motion compensation algorithm is performing the motion compensation, the motion estimation algorithm can perform motion estimation for a next block.

The motion compensation algorithm can store motion compensation results in the one or more buffers 432, which can be accessed and used by transform, quantization, and deblocking algorithms to perform transform, quantization and deblocking for the block 404A. The motion compensation algorithm can perform motion compensation for a next block while the transform, quantization, and/or deblocking algorithms perform the transform, quantization and/or deblocking for the block 404A. The transform, quantization and deblocking algorithms can similarly perform respective operations for the block 404A and the next block in parallel. In some examples, the motion estimation, motion compensation, transform, quantization, and deblocking algorithms can perform respective operations on different blocks in parallel.

The processing pipelines 414-420 can be implemented by hardware and/or software components. For example, the processing pipelines 414-420 can be implemented by one or more pixel processors. In some examples, each processing pipeline can be implemented by one or more hardware components. In some cases, each processing pipeline can use different hardware units and/or components to implement different stages in a pipeline of the processing pipeline. After the video pixel operations are performed to generate output pixels for display, the output pixels for display may be output to a memory, such as the memory 440 or the one or more buffers 432, such as a display buffer.

In some cases, the memory 404 may be a system memory or similar memory device, such as a double data rate (DDR) synchronous dynamic random-access memory (SDRAM) or any other memory device. The memory 440 may store the output pixels pending display on a display device.

The number of processing pipelines shown in FIG. 4 is merely an example provided for explanation purposes. One of ordinary skill in the art will appreciate that the architecture 400 can include greater or fewer processing pipelines than shown in FIG. 4.

For example, the number of processing pipelines implemented by the architecture 400 can be increased or reduced to include greater or fewer processing pipelines. Moreover, while the architecture 400 is shown to include certain components, one of ordinary skill will appreciate that the architecture 400 can include more or fewer components than those shown in FIG. 4. For example, the architecture 400 can also include, in some instances, other memory devices (e.g., one or more random access memory (RAM) components, read-only memory (ROM) components, cache memory components, buffer components, database components, and/or other memory devices), processing devices (e.g., one or more CPUs, GPUs, and/or other processing devices), interfaces (e.g., internal bus, etc.), and/or other components that are not shown in FIG. 4.

Figure 5:
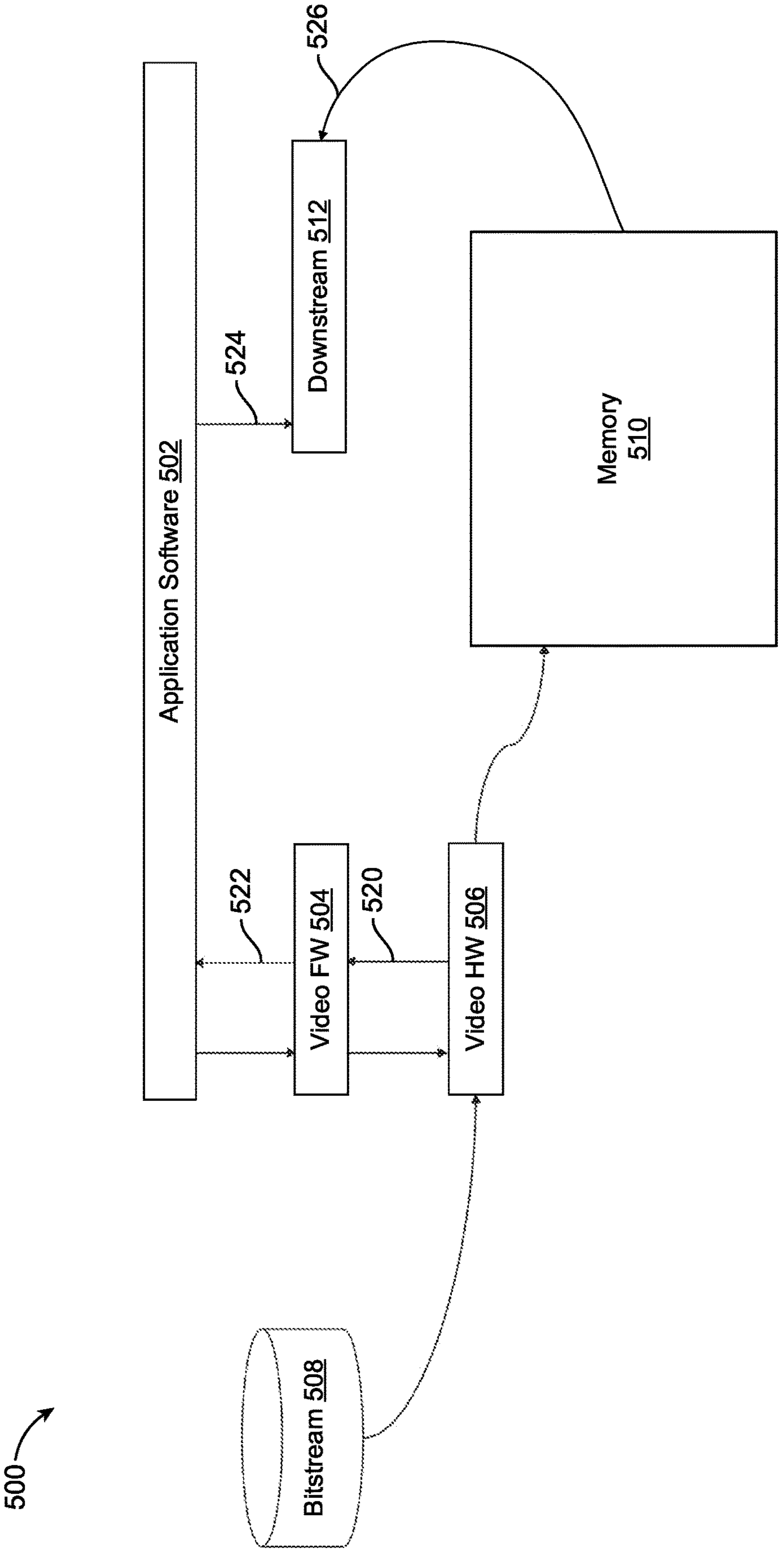
FIG. 5 is a block diagram illustrating an example architecture of a video coding system, in accordance with some examples.

FIG. 5 is a block diagram illustrating an example architecture 500 of a video coding system. In architecture 500, application software 502 may direct video firmware 504 and video hardware 506 to decode a bitstream 508 to memory 510 for downstream device 512 (e.g., a display device, network device to transmit the decoded image to a display device, and the like). In some cases, the application software 502 may be a driver, operating system, higher level user software, and the like. In some cases, the application software 502 may be executing on a CPU or other general purpose processor. The application software 502 may indicate to the video firmware 504 to decode bitstream 508. In some cases, the video firmware 504 may be a control processor for video firmware 504, such as control processor 210 of FIG. 2. The video hardware 506 may include video hardware components for processing video data, such as components from FIG. 2 including VSP 212, processing pipelines 214-220, DMA subsystem 230, interface 222, and the like.

The video firmware 504 may configure the video hardware 506 to obtain and decode the bitstream 508. In some cases, as the video hardware 506 decodes the bitstream 508 into portions of the image, the video hardware 506 may store the portions of the one or more image in the memory 510. In some examples, memory 510 may be the same as or similar to memory 240 of FIG. 2. In some cases, after an image is decoded and ready for display, the image may be stored in the memory 510 by the video hardware 506. The video hardware 506 may also send an interrupt 520 to the video firmware 504 indicating that the image is ready for display. The video firmware 504 can send an interrupt 522 to the application software 502 indicating the image is ready for display. The application software 502 may receive the interrupt 522 and the application software 502 may indicate 524 to the downstream device 512 to obtain 526 the decoded image for display. In some cases, the downstream device 512 may obtain (e.g., receive) 526 the decoded image from memory 510.

As noted previously, systems and techniques are described herein that can be used to perform video coding (e.g., encoding and/or decoding video data) utilizing a video codec parallel processing architecture with reduced leakage power. Leakage power can be power that is used by a particular parallel processing pipeline (e.g., a "pipe", such as one of the pipes 414-420 of FIG. 4, etc.) while the pipe is powered on and not processing video data. The total power consumption of a video coding architecture and/or a processing pipeline (e.g., one of the pipes 414-420 of FIG. 4) can be represented as Total Power=Dynamic Power+Leakage power=Dynamic Power+(Active Leakage Power+Non-Active Leakage Power).

In some cases, larger largest coding unit (LCU) (e.g., coding tree unit (CTU)) sizes used by a video codec can be associated with unbalanced workloads in a corresponding video codec parallel processing architecture, and unbalanced workloads can be associated with increased leakage power consumption by the video codec parallel processing architecture.

Figure 6:
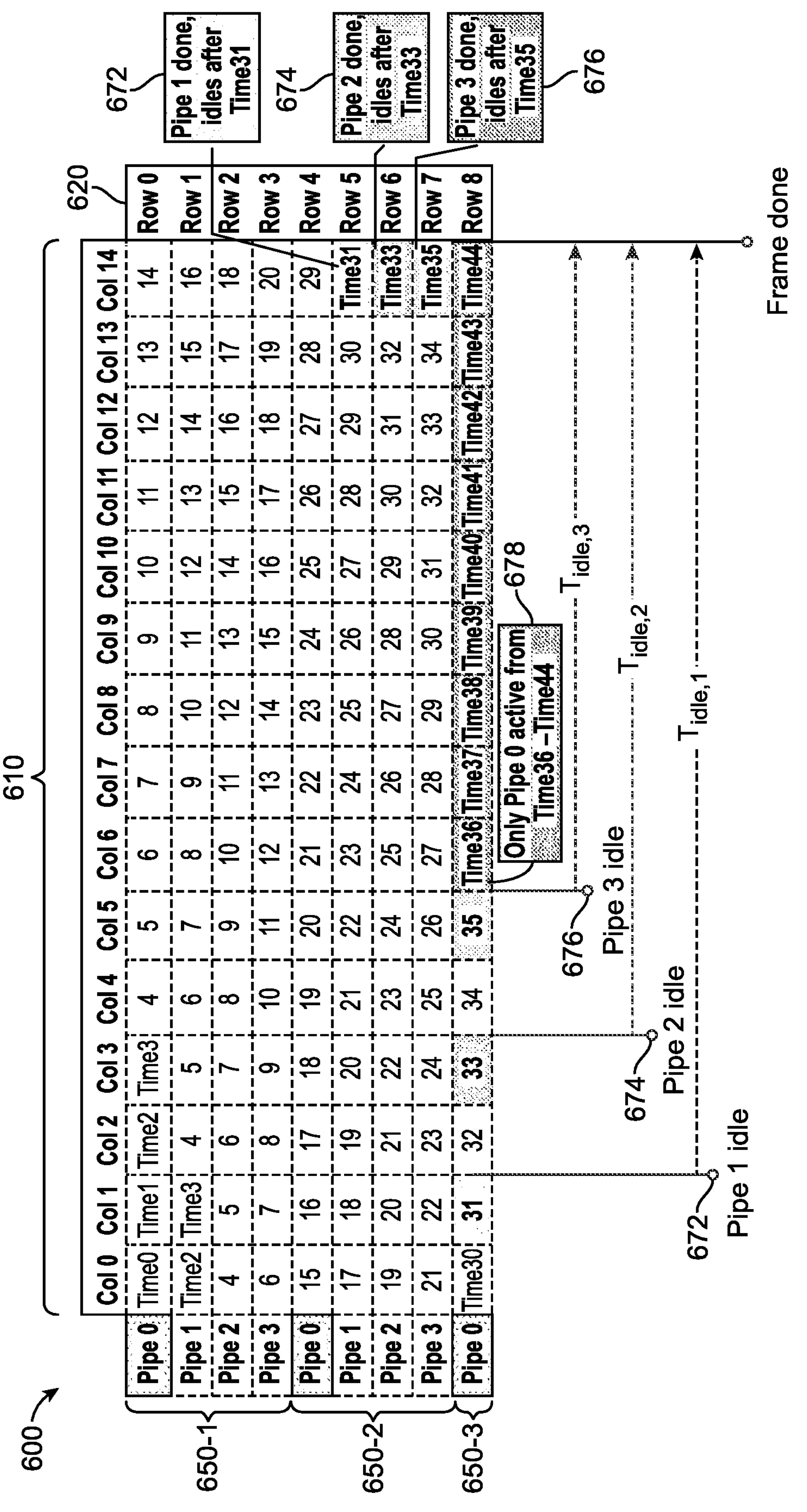
FIG. 6 is a diagram illustrating an example of an unbalanced workload associated with video codec parallel processing of a frame using a plurality of parallel pipes, in accordance with some examples.

For example, FIG. 6 is a diagram illustrating an example of video codec parallel processing 600 corresponding to an unbalanced workload across a plurality of parallel pipes used to process a frame of video data. An example frame of video data can include a plurality of LCUs each comprising a subset of pixels of the frame of video data. The plurality of LCUs can be arranged in a plurality of columns 610 (e.g., also referred to as LCU columns or columns of LCUs, and shown in FIG. 6 as the 15 columns "Col 0," "Col 1," . . . , "Col 14") and a plurality of rows 620 (e.g., also referred to as LCU rows or rows of LCUs, and shown in FIG. 6 as the 9 rows (Row 0," "Row 1," . . . , "Row 8").

In some aspects, the frame of video data shown in the example of FIG. 6 corresponds to a pixel resolution of 1920×1080 pixels and an LCU size of 128×128 pixels. For example, a 1920×1080 pixel video frame can include 15 LCU columns and 9 LCU rows of 128×128 pixel LCUs (e.g., a total of 15*9=135 LCUs).

Each LCU row of the plurality of LCU rows 620 can be processed by a respective pipe of a plurality of pipes included in the video codec parallel processing architecture 600. For example, the video codec parallel processing architecture 600 may include four parallel pipes (e.g., four parallel processing pipelines, processing elements (PEs), etc.). A first pipe is represented as "Pipe 0", a second pipe is represented as "Pipe 1", a third pipe is represented as "Pipe 2", and a fourth pipe is represented as "Pipe 3".

In one illustrative example, each respective pipe of the plurality of parallel pipes included in the video codec parallel processing architecture 600 can be the same, and can be configured to implement a plurality of video coding operations. For instance, each of the parallel pipes (e.g., Pipe 0-Pipe 3 of FIG. 6) can be configured to perform video encoding and/or video decoding, and can include a plurality of different video coding processing units. For example, each of the parallel pipes Pipe 0-Pipe 3 can include processing units configured to perform various video pixel operations such as motion estimation, motion compensation, transform and quantization, image deblocking, and/or any other video pixel operations.

The processing pipelines Pipe 0-Pipe 3 (and/or each individual processing pipeline of FIG. 6) can perform specific video pixel operations in parallel. For example, each processing pipeline Pipe 0-Pipe 3 can perform multiple operations (and/or process data) simultaneously and/or significantly in parallel. As another example, multiple processing pipelines of Pipe 0-Pipe 3 can perform operations (and/or process data) simultaneously and/or significantly in parallel. In one illustrative example, the parallel pipes Pipe 0-Pipe 3 of FIG. 6 can be the same as or similar to the parallel processing pipelines 414-420 of FIG. 4.

Each respective processing pipeline (e.g., Pipe 0-Pipe 3 of FIG. 6) can be configured to process one LCU row of the plurality of LCU rows 620. For example, the first processing pipeline Pipe 0 can be used to process LCU Row 0, the second processing pipeline Pipe 1 can be used to process LCU Row 1, the third processing pipeline Pipe 2 can be used to process LCU Row 2, and the fourth processing pipeline Pipe 3 can be used to process LCU Row 3.

Each pipe can begin processing of its respective LCU row 620 beginning from LCU Col 0, and subsequently processing the remaining LCUs of the row in sequential order from LCU Col 0 through LCU Col 14. For example, processing of the frame of video data can begin from the top-left corner of the frame of video data, using Pipe 0 to process LCU Row 0 beginning from the Row 0, Col 0 LCU. Using (x,y) notation to represent an LCU located at LCU Column x and LCU Row y, Pipe 0 can process in sequential order the LCUs {(0,0), (1,0), (2,0), . . . , (13,0), (14,0)}. Pipe 1 can process in sequential order the LCUs {(0,1), (1,1), (2,1), . . . , (13,1), (14,1)}. Pipe 2 can process in sequential order the LCUs {(0,2), (1,2), (2,2), . . . , (13,2), (14,2)}. Pipe 3 can process in sequential order the LCUs {(0,3), (1,3), (2,3), . . . , (13,3), (14,3)}.

In some aspects, each respective pipe of the plurality of pipes (e.g., Pipe 0-Pipe 3 of FIG. 6) can be configured to process one LCU row 620 at a time. For example, the plurality of pipes Pipe 0-Pipe 3 can be configured to process the LCU rows 620 using wavefront processing. The grid representation of FIG. 6 (e.g., the grid of LCUs corresponding to the 15 LCU columns 610 and the 9 LCU rows 620) indicates a respective time at which the corresponding LCU is processed. For example, Pipe 0 processes the (0,0) LCU at Time 0, processes the (1,0) LCU at Time 1, processes the (2,0) LCU at Time 2, . . . , processes the (13,0) LCU at Time 13, and processes the (14,0) LCU at Time 14.

In one illustrative example, each pipe of the video codec parallel processing architecture 600 can be configured to complete processing of the last LCU of its currently processed LCU row, and begin processing the first LCU of the next available (e.g., next unprocessed) LCU row. For example, after completing processing of the Col. 14, Row 0 LCU at Time 14, Pipe 0 can begin processing of the Col. 0, Row 4 LCU at Time 15. After completing processing of the Col. 14, Row 1 LCU at Time 16, Pipe 1 can begin processing of the Col. 0, Row 5 LCU at Time 17. After completing processing of the Col. 14, Row 2 LCU at Time 18, Pipe 2 can begin processing the Col. 0, Row 6 LCU at Time 19. After completing processing of the Col. 14, Row 3 LCU at Time 20, Pipe 3 can begin processing the Col. 0, Row 7 LCU at Time 21.

The plurality of LCU rows 620 can be processed in multiple groups (e.g., batches, subsets, rounds, etc.) by the multiple parallel pipes Pipe 0-Pipe 3. For example, a first LCU processing group 650-1 corresponds to the first respective LCU row processed by each parallel pipe, and includes LCU rows 0-3. A second LCU processing group 650-2 corresponds to the second respective LCU row processed by each parallel pipe, and includes LCU rows 4-7. A third LCU processing group 650-3 corresponds to the third respective LCU row processed by each parallel pipe, and includes only LCU row 8 (e.g., only Pipe 0 processes a third respective LCU row for the frame of video data, as no unprocessed LCU rows remain after Pipes 1-3 complete processing the last/Col. 14 LCU of their respective second LCU rows 650-2).

An illustrative example of an LCU processing sequence performed for the 15 LCU columns 610 and 9 LCU rows 620 by the video codec parallel processing architecture 600 and the four parallel pipes Pipe 0-Pipe 3 is described below. Pipe 0 starts processing the first LCU in Row 0 (e.g., the (0,0) LCU at Time 0. Pipe 1, Pipe 2, and Pipe 3 are idle and do not process any LCUs at Time 0. At Time 1, Pipe 0 moves to and processes the next LCU in the same Row 0 (e.g., the (1,0) LCU). Pipe 1, Pipe 2, and Pipe 3 remain idle at Time 1.

Pipe 1 is activated from the idle state and begins by processing the first LCU in Row 1 (e.g., the (0,1) LCU), but must wait to start until Time 2. For example, Pipe 1 delays processing of the (0,1) LCU until Time 2 based on neighbor dependency on the Pipe 0 processing results for the adjacent (0,0) and (1,0) LCUs, which are processed at Time 0 and Time 1, respectively (e.g., Pipe 1 does not start processing until Time 2 because Pipe 1 requires the result of the LCU processing by Pipe 0 at Time 0 and Time 1).

Pipe 2 and Pipe 3 remain idle at Time 2.

At Time 3, Pipe 1 has completed processing of the (0,1) LCU and moves to the next LCU in Row 1 (e.g., the (1,1) LCU). Pipe 2 and Pipe 3 remain idle at Time 3.

Pipe 2 is activated from the idle state and begins by processing the first LCU in Row 2 (e.g., the (0,2) LCU), but must wait to start until Time 4 (due to neighbor dependency on Pipe 1 beginning LCUs). At Time 5, Pipe 2 moves to the next LCU in Row 2 (e.g., the (1,2) LCU). Pipe 3 remains in the idle state at Time 4 and Time 5.

Pipe 3 is activated from the idle state and begins by processing the first LCU in Row 3 (e.g., the (0,3) LCU), but must wait to start until Time 6 (due to neighbor dependency on Pipe 2 beginning LCUs). At Time 6, all four pipes Pipe 0-Pipe 3 of the video codec parallel processing architecture 600 are each processing a respective LCU for the first time during processing of the current frame of video data.

At Time 0: Pipe 0 starts processing at (0,0) LCU. Pipes 1-3 idle.

At Time 1: Pipe 0 processes (1,0) LCU. Pipes 1-3 idle.

At Time 2: Pipe 0 processes (2,0) LCU. Pipe 1 starts processing at (0, 1) LCU. Pipes 2-3 idle.

At Time 3: Pipe 0 processes (3,0) LCU. Pipe 1 processes (1,1) LCU. Pipes 2-3 idle At Time 4: Pipe 0 processes (4,0) LCU. Pipe 1 processes (2,1) LCU. Pipe 2 starts processing at (0,2) LCU. Pipe 3 idle.

At Time 5: Pipe 0 processes (5,0) LCU. Pipe 1 processes (3,1) LCU. Pipe 2 processes (1,2) LCU. Pipe3 idle.

At Time 6: Pipe 0 processes (6,0) LCU. Pipe 1 processes (4,1) LCU. Pipe 2 processes (2,2) LCU. Pipe 3 starts processing at (0,3) LCU.

At Time 7: Pipe 0 processes (7,0) LCU. Pipe 1 processes (5,1) LCU. Pipe 2 processes (3,2) LCU. Pipe 3 processes (1,3) LCU.

In the example parallel processing sequence of FIG. 6, the four pipes (e.g., Pipe 0-Pipe 3) do not become saturated with LCU processing tasks until Time 6, when Pipe 3 begins processing the first LCU of the corresponding LCU row 3 (e.g., when Pipe 3 begins processing the (0,3) LCU). In some aspects, the idle time between Time 0, when Pipe 0 begins processing of the (0,0) LCU, and the respective start time when each of the Pipes 1-3 begins processing a first LCU can be referred to as a warm-up time for the respective pipe.

For example, Pipe 1 has a warm-up time from Time 0-1. Pipe 2 has a warm-up time from Time 0-3. Pipe 3 has a warm-up time from Time 0-5. During the respective warm-up time for a pipe, the pipe is in a powered-on but idle state. The power consumption of a pipe during the warm-up time corresponds to non-active leakage power (e.g., and the power consumption of a pipe while processing an LCU corresponds to dynamic power+active leakage power).

When a pipe finishes processing a corresponding LCU row, the pipe is configured to begin processing the first (e.g., Column 0) LCU of the next row that has yet to be processed. For example, at Time 14, Pipe 0 finishes processing the last LCU of Row 0. At and after Time 14, the next unprocessed LCU row is Row 4, and for Time 15, Pipe 0 is configured to begin processing the first (e.g., Column 0) LCU of Row 4. For the second LCU processing group 650-2, Pipes 1-3 are similarly configured to begin processing the LCU Rows 5-7, with the same respective relative time offsets to the beginning of LCU row processing by Pipe 0 (e.g., Pipe 0 begins processing Row 4 at Time 15, Pipe 1 has a +2 time offset and begins processing Row 5 at Time 17, Pipe 2 has a +4 time offset and begins processing Row 6 at Time 19, and Pipe 3 has a +6 time offset and begins processing Row 7 at Time 21).

In the example processing sequence of FIG. 6, at Time 29, Pipe 0 completes processing the last LCU of Row 4 (e.g., the (14,4) LCU). Pipe 0 completes its respective LCU row processing before Pipes 1-3 complete their respective LCU row processing for the second LCU processing group 650-2 (e.g., Pipe 1 completes the respective LCU Row 5 processing for the second LCU processing group 650-2 at the later Time 31, Pipe 2 completes the respective LCU Row 6 processing for the second LCU processing group 650-2 at the later Time 33, and Pipe 3 completes the respective LCU Row 7 processing for the second LCU processing group 650-2 at the later Time 35).

After completing the LCU Row 4 processing of the (14,4) LCU at Time 29, LCU Row 8 is the only remaining unprocessed LCU row of the plurality of LCU rows 620. For the third LCU processing group 650-3, Pipe 0 can be configured to begin processing the first LCU of Row 8. For example, the third LCU processing group 650-3 can begin with Pipe 0 processing the (0,8) LCU at Time 30, while Pipes 1-3 continue processing their respective LCU rows of the second LCU processing group 650-2. Processing for the third LCU processing group 650-3 can be completed based on Pipe 0 completing processing of the last LCU of Row 8 (e.g., the (14,8) LCU) at Time 44.

In some examples, Pipes 1-3 enter the idle state after completing processing of the last (e.g., Column 14) LCU of their respective LCU row for the second LCU processing group 650-2, as there are no remaining unprocessed LCU rows that can be assigned to any of Pipes 1-3 for the current frame of video data. Pipes 1-3 may enter the idle state after completing processing of the last LCU of their respective LCU row for the second LCU processing group 650-2, and may remain in the idle state (e.g., consuming non-active leakage power) until Pipe 0 completes processing of the last LCU of Row 8 (e.g., the (14,8) LCU) at Time 44.

For example, at block 672, Pipe 1 finishes LCU processing for LCU Row 5 at Time 31 and can be configured to enter the idle state beginning from Time 32. Pipe 1 can idle and consume non-active leakage power from Time 32-44, for an idle time $T_{idle,1}$.

At block 674, Pipe 2 finishes LCU processing for LCU Row 6 at Time 33 and can be configured to enter the idle state beginning from Time 34. Pipe 2 can idle and consume non-active leakage power from Time 34-44, for an idle time $T_{idle,2}$.

At block 676, Pipe 3 finishes LCU processing for LCU Row 7 at Time 35 and can be configured to enter the idle state beginning from Time 36. Pipe 3 can idle and consume non-active leakage power from Time 36-44, for an idle time $T_{idle,3}$.

At block 678, Pipe 0 becomes the only one of the four parallel processing pipelines of the video codec parallel processing architecture 600 that is configured to actively process LCUs. For example, Pipe 0 can be the only active pipe from Time 36-44 (e.g., equal to $T_{idle,3}$, the idle time of the last pipe to complete LCU processing for second LCU processing group 650-2).

In some aspects, all four parallel processing pipelines Pipe 0-Pipe 3 of the video codec parallel processing architecture 600 are actively configured to process respective LCUs of the current frame of video data between Time 6-31. Time durations where each respective pipe of the plurality of parallel pipes is actively processing an LCU can be referred to as balanced workloads. The remaining times are unbalanced workloads, where at least one pipe is idle and not processing an LCU. For example, for Time 0-5 and Time 32-44, the video codec parallel processing architecture 600 is configured and/or associated with an unbalanced workload, where one or more pipes of the plurality of parallel pipes are idle (e.g., not actively processing an LCU, consuming non-active leakage power, etc.).

In some aspects, an unbalanced workload for a video codec parallel processing architecture (e.g., such as video codec parallel processing architecture 600 of FIG. 6) can be associated with an increased in non-active leakage power consumption (e.g., absolute non-active leakage power and/or relative non-active leakage power). The ratio or percentage of pipe idle time over the total frame processing time may increase for increasingly parallel architectures (e.g., architectures including a larger number of parallel pipes). The percentage of pipe idle time over total frame processing time can, in some examples, increase with larger LCU sizes (e.g., such as larger LCU sizes that may be utilized by and/or associated with newer video codecs, upcoming or future video codecs, etc. Table 2, below, includes example idle time summary information for different video frame resolutions processed by an example 4-pipe video codec parallel processing architecture and an example 2-pipe video codec parallel processing architecture.

TABLE 2

Idle time summary information for different video frame resolutions processed by an example 4-pipe video codec parallel processing architecture and an example 2-pipe video codec parallel processing architecture.

| Frame Resolution | 4-Pipe Architecture | | 2-Pipe Architecture | |
|---|---|---|---|---|
| (LCU = 128 × 128) | Number of Idle Pipes | Idle over frame processing time | Number of Idle Pipes | Idle over frame processing time |
| 1280 × 720 | 2 | 55% | 1 | 13% |
| 1920 × 1080 | 3 | 34% | 1 | 20% |
| 3840 × 2160<br>4096 × 2160 | 3 | 20% | 1 | 12% |
| 7680 × 4320<br>8192 × 4320 | 2 | 12% | 0 | 0% |

As noted previously, there is a need for systems and techniques that can be used to reduce leakage power associated with video codec parallel processing (e.g., encoding video data using a plurality of parallel pipes and/or decoding video data using a plurality of parallel pipes), in both absolute leakage power and percentage of total power consumption.

Figure 7:
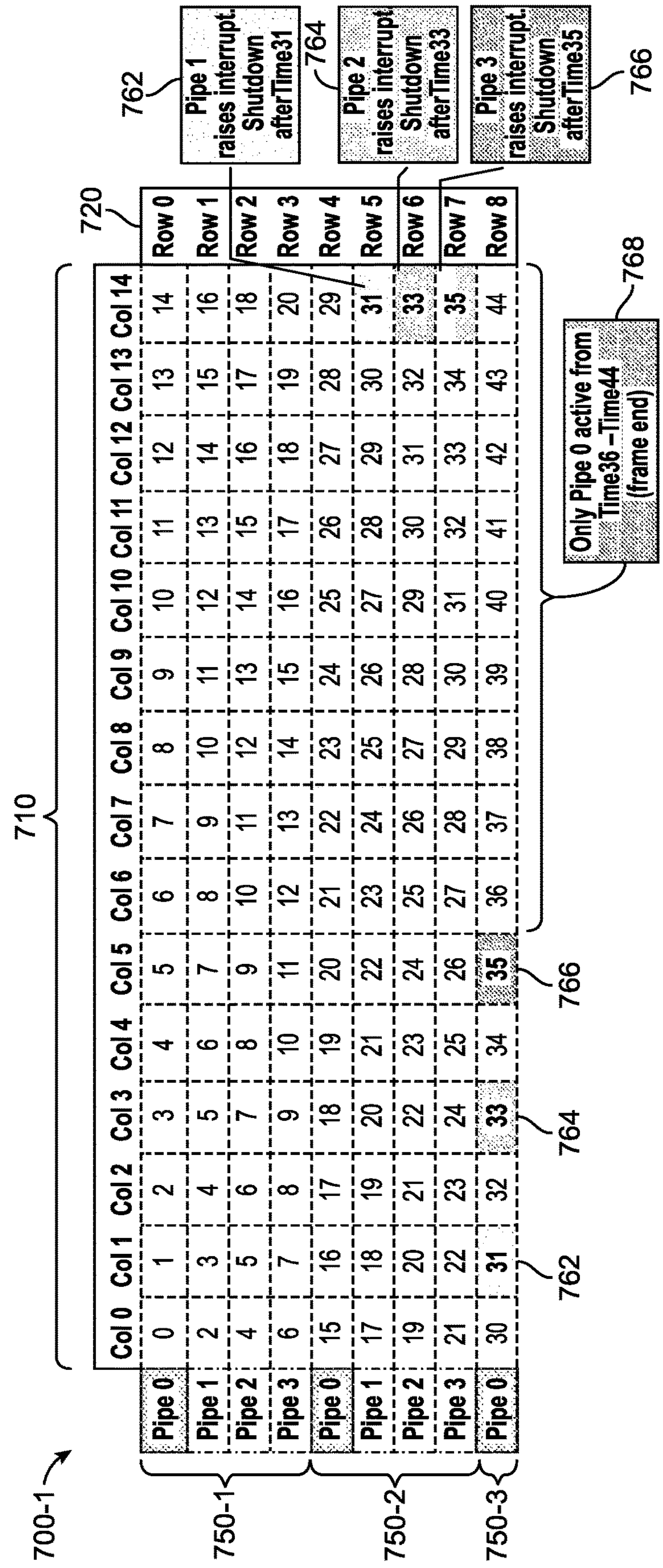
FIG. 7 is a diagram illustrating an example of video codec parallel processing of frames using respective interrupt signals to shut down one or more parallel pipes of a plurality of parallel pipes, in accordance with some examples.
Figure 7:
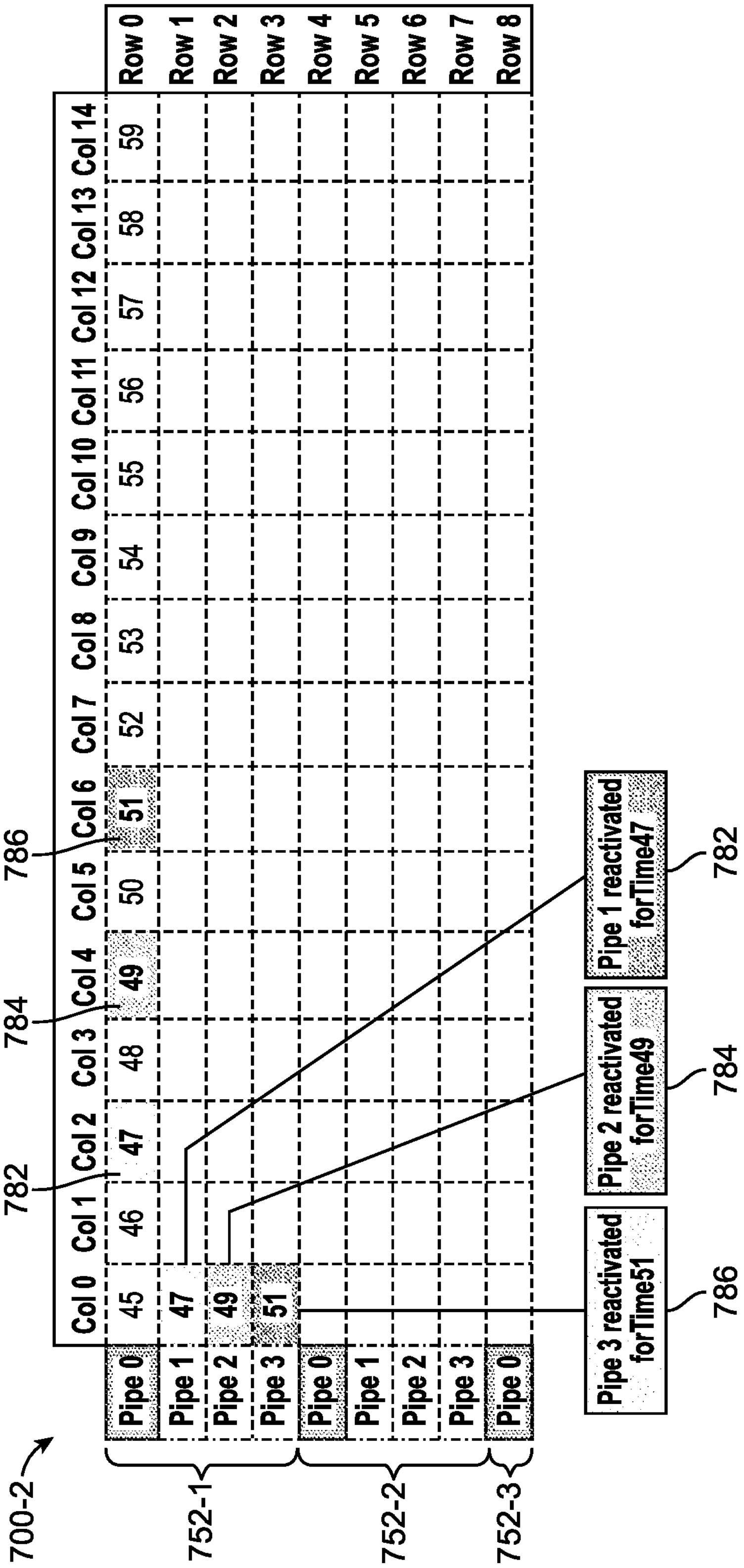

FIG. 7 is a diagram illustrating an example of video codec parallel processing for a first frame 700-1 and a second frame 700-2 of video data, where the video codec parallel processing workload is balanced across a plurality of parallel processing pipelines based on using one or more interrupt signals to shut down a corresponding one or more pipes that have completed LCU processing for the current frame. In one illustrative example, the video codec parallel processing of FIG. 7 can be sued to implement a low-leakage micro architecture for video codec parallel encoding and decoding, based on using the respective interrupt signals to reduce the non-active leakage power of one or more parallel pipes.

In some aspects, each frame of video data (e.g., the first frame 700-1, the second frame 70-2, etc.) can be the same as or similar to the frame of video data corresponding to the example of FIG. 6. For instance, the first frame 700-1 and the second frame 700-2 of FIG. 7 can each comprise a 1920×1080 pixel resolution frame of video data. The first frame 700-1 and the second frame 700-2 can include a plurality of LCU columns 710, which can be the same as or similar to the plurality of LCU columns 610 of FIG. 6. The first frame 700-1 and the second frame 700-2 can include a plurality of LCU rows 720, which can be the same as or similar to the plurality of LCU rows 620 of FIG. 6. For example, the first frame 700-1 and the second frame 700-2 can each utilize an LCU size of 128×128 pixels, corresponding to 15 LCU columns in the plurality of LCU columns 710 and 9 LCU rows in the plurality of LCU rows 720.

A video codec parallel processing architecture associated with the processing sequence for the frames 700-1, 700-2 of FIG. 7 can include a plurality of parallel processing elements (e.g., "pipes") Pipe 0, Pipe 1, Pipe 2, Pipe 3. The pipes Pipe 0-Pipe 3 of FIG. 7 can be the same as or similar to the pipes Pipe 0-Pipe 3 of FIG. 6 and/or can be the same as or similar to the parallel processing pipelines 414-420 of FIG. 4, etc.

In an example parallel processing sequence corresponding to FIG. 7, the parallel pipes Pipe 0-Pipe 3 can be configured to perform LCU processing for a particular LCU row of the plurality of LCU rows 720. For example, Pipe 0-Pipe 3 can perform processing for the first frame 700-1 based on a first LCU processing group 750-1 (e.g., corresponding to using Pipe 0-Pipe 3 to process LCU Rows 0-3, respectively), a second LCU processing group 750-2 (e.g., corresponding to using Pipe 0-Pipe 3 to process LCU Rows 4-7, respectively), and a third LCU processing group 750-3 (e.g., corresponding to using Pipe 0 to process LCU Row 8).

Pipe 0-Pipe 3 can perform processing for the second frame 700-2 using a first LCU processing group 752-1, a second LCU processing group 752-2, and a third LCU processing group 752-3, which may be the same as or similar to the first LCU processing group 750-1, second LCU processing group 750-2, and third LCU processing group 750-3 (respectively) that are associated with the first frame of video data 700-1.

In some aspects, the first LCU processing group 750-1, second LCU processing group 750-2, and third LCU processing group 750-3 (respectively) associated with the first frame of video data 700-1 of FIG. 7 can be the same as or similar to the first LCU processing group 650-1, second LCU processing group 650-2, and third LCU processing group 650-3 (respectively) of FIG. 6. In some examples, the first LCU processing group 752-1, second LCU processing group 752-2, and third LCU processing group 752-3 associated with the second frame of video data 700-2 of FIG. 7 can be the same as or similar to the first LCU processing group 650-1, second LCU processing group 650-2, and third LCU processing group 650-3 (respectively) of FIG. 6.

In one illustrative example, the systems and techniques can be used to provide a low-leakage video codec parallel processing architecture based on configuring one or more (or all) of Pipe 0-Pipe 3 to raise a respective interrupt signal indicative of the particular pipe completing processing of a last LCU of a last LCU row associated with the particular pipe for the current frame. In some aspects, the respective interrupt signal can be a "Last_LCU_Row_Done" interrupt signal, among various other interrupt signals and/or indications. When the "Last_LCU_Row_Done" interrupt signal is raised (e.g., by one of the pipes, to the video code IP block firmware), a combination of the video codec software driver and firmware can be configured to shut off the pipe that raised the interrupt. As noted above, when the pipe is shut off, the pipe does not contribute non-active leakage to the total power consumption.

In some aspects, a pipe can raise the Last_LCU_Row_Done interrupt signal based on the pipe completing processing of the last LCU of an LCU row assigned to the pipe (e.g., based on completing processing of a Col. 14 LCU shown in FIG. 7), and further based on a determination that there are no unprocessed LCU rows remaining within the plurality of LCU rows 720 of the current frame of video data.

For example, in the second LCU processing group 750-2 for the first frame 700-1, Pipe 1 can raise an interrupt signal 762 (e.g., a Last_LCU_Row_Done interrupt signal) after completing processing of the (14,5) LCU at Time 31. Pipe 1 may raise the interrupt signal 762 based on determining that no unprocessed LCU rows remain within the plurality of LCU rows 720. For example, after Time 31 (e.g., when Pipe 1 completes processing of LCU Row 5, and when Pipe 1 raises the interrupt signal 762), LCU Row 6 has partially completed processing by Pipe 2, LCU Row 7 has partially completed processing by Pipe 3, and LCU Row 8 has partially completed and recently began processing by Pipe 0.

Pipe 2 can be configured to raise the interrupt signal 764 (e.g., a Last_LCU_Row_Done interrupt signal) after Time 33, after completing processing of the last LCU of LCU Row 6 (e.g., the (14,6) LCU). After Time 33, Pipe 2 has finished processing LCU Row 6 and determines that no unprocessed LCU rows remain within the plurality of LCU rows 720. For example, at and after Time 33, LCU Row 7 has partially completed processing by Pipe 3 and LCU Row 8 has partially completed processing by Pipe 0.

Pipe 3 can be configured to raise the interrupt signal 766 (e.g., a Last_LCU_Row_Done interrupt signal) after Time 35, after completing processing of the last LCU of LCU Row 7 (e.g., the (14,7) LCU). After Time 35, Pipe 3 has finished processing LCU Row 7 and determines that no unprocessed LCU rows remain within the plurality of LCU rows 720. For example, at and after Time 35, LCU Row 8 is the only row that includes one or more unprocessed LCUs. However, at and after Time 35, LCU Row 8 is not an unprocessed LCU row, as a portion of the Row 8 LCUs have previously completed processing prior to Time 35 (e.g., LCU (0,8)-LCU (4,8) are processed by Pipe 0 prior to Time 35 and Pipe 3 raising the interrupt signal 766).

Pipe 0 does not raise an interrupt because Pipe 0 is configured to process a respective LCU during each time between Time 0 (e.g., beginning of LCU processing for the frame 700-1) and Time 44 (e.g., end of LCU processing for the frame 700-1).

In one illustrative example, the Last_LCU_Row_Done interrupt signal (e.g., the interrupt signal 762 raised by Pipe 1 after Time 31 of frame 700-1, the interrupt signal 764 raised by Pipe 2 after Time 33 of frame 700-1, and/or the interrupt signal 766 raised by Pipe 3 after Time 35 of frame 700-1, etc.) can be used to shut down or power off the respective pipe that raised the interrupt signal. In a shutdown or power-off state, a pipe does not consume or draw leakage power, including the non-active leakage power that would otherwise be associated with the pipe remaining the idle state (e.g., as in the example of FIG. 6).

In some aspects, the parallel pipes Pipe 1-Pipe 3 can be configured to raise the Last_LCU_Row_Done interrupt signal to a firmware level of the video codec parallel processing architecture. For example, Pipe 1 can raise the interrupt 762 to the video codec firmware, Pipe 2 can raise the interrupt 764 to the video codec firmware, and Pipe 3 can raise the interrupt 766 to the video codec firmware. In some examples, the Last_LCU_Row_Done interrupt signal (e.g., interrupt 762, 764, 766, etc.) can be received by a video codec firmware that is the same as or similar to the video firmware 504 of FIG. 5. For example, the video hardware 506 of FIG. 5 can implement a video codec parallel processing architecture (e.g., such as the 4-pipe video codec parallel processing architecture of FIG. 7, etc.) and can transmit one or more Last_LCU_Row_Done interrupt signals to the video firmware 504 using the interrupt 520 of FIG. 5.

In some aspects, a respective pipe of a video codec parallel processing architecture can be configured to raise the Last_LCU_Row_Done interrupt signal instead of entering an idle state and consuming non-active leakage power. For example, Pipe 1 of FIG. 6 enters the idle state and consumes non-active leakage power from Time 32 to at least the end of LCU processing for the current frame (e.g., idles from Time 32-44).

In the example of FIG. 7, Pipe 1 can be configured to raise the interrupt 762 to the video firmware at Time 31, and can be shut down (e.g., powered off) by the video firmware in response to the video firmware receiving the interrupt 762. Based on raising the interrupt 762, Pipe 1 remains powered off and does not consume non-active leakage power from Time 32 to at least the end of LCU processing for the current frame 700-1 (e.g., shutdown for at least Time 32-44).

In another example, Pipe 2 of FIG. 6 enters the idle state and consumes non-active leakage power from Time 34 to at least the end of LCU processing for the current frame (e.g., idles from Time 34-44). In the example of FIG. 7, Pipe 2 can be configured to raise the interrupt 764 to the video firmware at Time 33, and can be shut down (e.g., powered off) by the video firmware in response to the video firmware receiving the interrupt 764. Based on raising the interrupt 764, Pipe 2 remains powered off and does not consume non-active leakage power from Time 34 to at least the end of LCU processing for the current frame 700-1 (e.g., shutdown for at least Time 34-44).

In another example, Pipe 3 of FIG. 6 enters the idle state and consumes non-active leakage power from Time 36 to at least the end of LCU processing for the current frame (e.g., idles from Time 36-44). In the example of FIG. 7, Pipe 3 can be configured to raise the interrupt 766 to the video firmware at Time 35, and can be shut down (e.g., powered off) by the video firmware in response to the video firmware receiving the interrupt 766. Based on raising the interrupt 766, Pipe 3 remains powered off and does not consume non-active leakage power from Time 36 to at least the end of LCU processing for the current frame 700-1 (e.g., shutdown for at least Time 36-44).

In some aspects, a pipe can remain in the shutdown or powered-off state across portions of two consecutive frames of video data that are processed sequentially by the video codec parallel processing architecture. For example, the interrupt 762 can cause Pipe 1 to be shut down for Time 32-44 of frame 700-1, and to remain in the shutdown state until a corresponding reactivation 782 at Time 47 in frame 700-2. In one illustrative example, each pipe raising the Last_LCU_Row_Done interrupt signal can be shut down or powered off for the same number of time slots.

For example, each of Pipe 1, Pipe 2, and Pipe 3 can be shut down or powered off for a duration of 15 time slots, based on raising the respective interrupt signals 762, 764, 766. The offset between the respective interrupt signals raised by different pipes can correspond to and/or be the same as the offset between the respective reactivation times for the different pipes.

For example, Pipe 1 raises interrupt 762 at Time 31 with a two time slot offset from Pipe 2 raising interrupt 764 at Time 33, which has a further two time slot offset from Pipe 3 raising interrupt 766 at Time 35. The Pipe 1 reactivation 782 can be configured for Time 47 within the next video frame 700-2, with a two time slot offset from the Pipe 2 reactivation 784 configured for Time 49 within the next video frame 700-2, which has a further two time slot offset from the Pipe 3 reactivation 786 configured for Time 51 within the next video frame 700-2. Each of Pipe 1, Pipe 2, and Pipe 3 can be shut down or powered off for a total of 15 time slots after raising the respective interrupt signal 762, 764, 766, in the example of FIG. 7.

Pipe 1 is completely powered off and draws no non-active leakage power between Time 32 (e.g., within the first frame 700-1) and Time 46 (e.g., within the second frame 700-2), until being reactivated 782 at Time 47 where Pipe 1 begins processing its first LCU in the second frame 700-2.

Pipe 2 is completely powered off and draws no non-active leakage power between Time 34 (e.g., within the first frame 700-1) and Time 48 (e.g., within the second frame 700-2), until being reactivated 784 at Time 49 where Pipe 2 begins processing its first LCU in the second frame 700-2.

Pipe 3 is completely powered off and draws no non-active leakage power between Time 36 (e.g., within the first frame 700-1) and Time 50 (e.g., within the second frame 700-2), until being reactivated 786 at Time 51 where Pipe 2 begins processing its first LCU in the second frame 700-2.

In one illustrative example, based on configuring the parallel processing pipelines Pipe 1, Pipe 2, Pipe 3 to raise the respective Last_LCU_Row_Done interrupt signals 762, 764, 766, the systems and techniques can reduce or eliminate non-active leakage power consumption during processing of the frames of video data 700-1, 700-2, etc. In the example of FIG. 7, Pipes 1-3 are each completely powered off and do not draw non-active leakage power after completing processing of their respective last allocated LCU for the first frame 700-1. From Time 36-Time 44 (e.g., the duration 768), only Pipe 0 is actively processing an LCU, and only Pipe 0 is associated with a leakage power consumption (e.g., the active leakage power of Pipe 0 while processing LCUs).

In some aspects, an idle state can occur for any pipe or parallel processing element of a video codec parallel processing microarchitecture (e.g., a video codec architecture with multiple PEs or pipes). In some examples, a respective interrupt signal can be raised for any parallel processing elements (e.g., PEs, pipes, etc.) when an idle status occurs and the parallel processing element can be shut down to reduce non-active leakage power consumption. The systems and techniques described herein can be implemented in a video codec parallel processing microarchitecture such that any pipe is fully shut down during idle cycle, and non-active leakage power is reduced and/or eliminated from the total power consumption of the video codec parallel processing microarchitecture.

Figure 8:
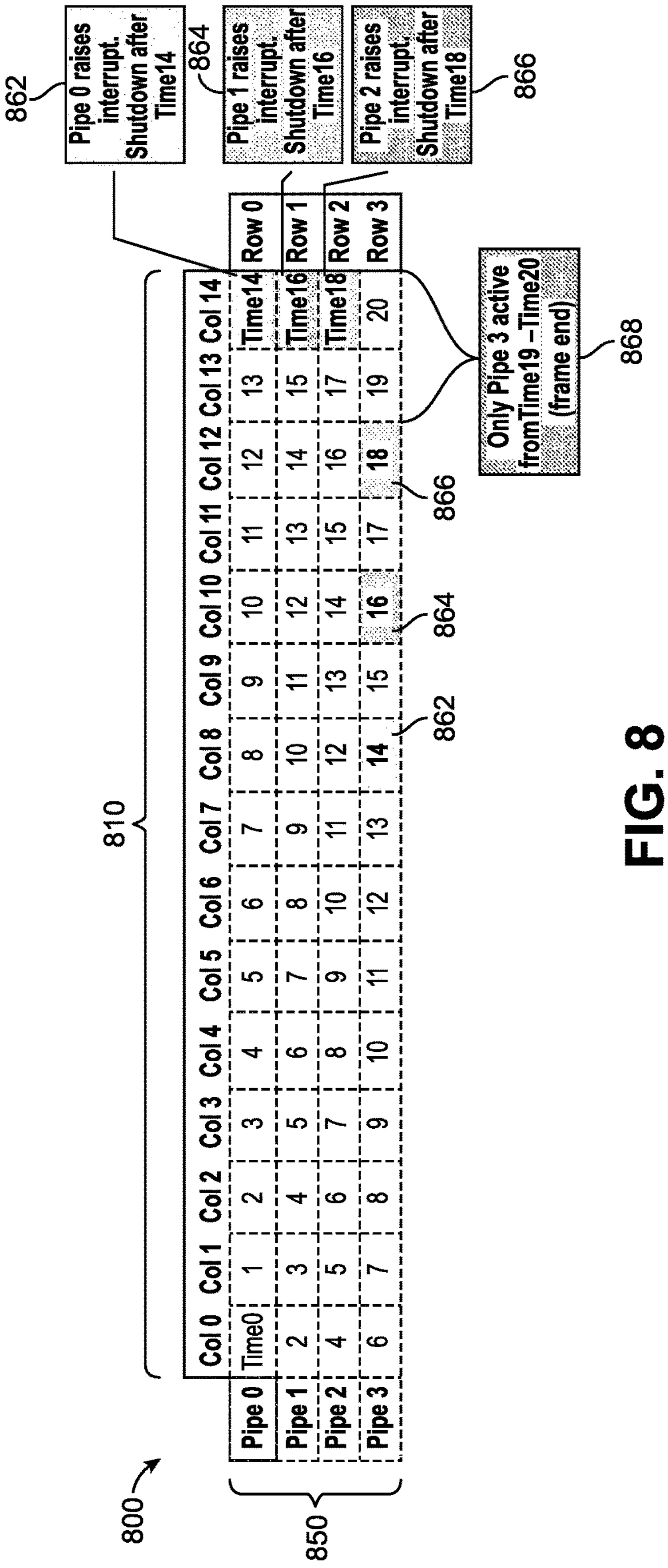
FIG. 8 is a diagram illustrating another example of video codec parallel processing of frames using respective interrupt signals to shut down one or more parallel pipes of a plurality of parallel pipes, in accordance with some examples.

For example, FIG. 8 is a diagram illustrating an example of a video codec parallel processing architecture 800 where four pipes (e.g., Pipe 0-Pipe 3, which can be the same as or similar to the respective Pipe 0-Pipe 3 of FIG. 6 and/or FIG. 7) are used to perform parallel video coding operations for a frame of video data comprising 15 LCU Columns 810 and four LCU rows 850. In this example, each pipe can be configured to process a single LCU row.

Pipe 0 processes LCU Row 0 from Time 0-Time 14. At Time 14, Pipe 0 completes processing of LCU Row 0 and determines that no unprocessed LCU rows remain in the plurality of LCU rows 850. At Time 14, Pipe 0 can raise a corresponding interrupt signal 862 to the video firmware, and can be configured to shut down or power-off after Time 14 until at least the end of LCU processing for the current frame at Time 20.

Pipe 1 processes LCU Row 1 from Time 2-Time 16. At Time 16, Pipe 1 completes processing of LCU Row 1 and determines that no unprocessed LCU rows remain in the plurality of LCU rows 850. At Time 16, Pipe 1 can raise a corresponding interrupt signal 864 to the video firmware, and can be configured to shut down or power-off after Time 16 until at least the end of LCU processing for the current frame at Time 20.

Pipe 2 processes LCU Row 2 from Time 4-Time 18. At Time 18, Pipe 2 completes processing of LCU Row 2 and determines that no unprocessed LCU rows remain in the plurality of LCU rows 850. At Time 18, Pipe 2 can raise a corresponding interrupt signal 866 to the video firmware, and can be configured to shut down or power-off after Time 18 until at least the end of LCU processing for the current frame at Time 20.

Pipe 3 processes LCU Row 3 from Time 6-Time 20. At Time 20, Pipe 3 completes processing of LCU Row 3 and LCU processing for the current frame of video data (e.g., LCU processing for the plurality of LCU rows 850) is completed. For the time duration 868, between Time 19 and Time 20, only Pipe 3 is active in processing respective LCUs and consuming power (e.g., the dynamic power+active leakage power of Pipe 3). For Time 19 and Time 20, each of Pipe 0, Pipe 1, and Pipe 2 is configured to shut down or power-off completely, based on raising the respective interrupt signal 862, 864, 866, and does not draw non-active leakage power.

Figure 9:
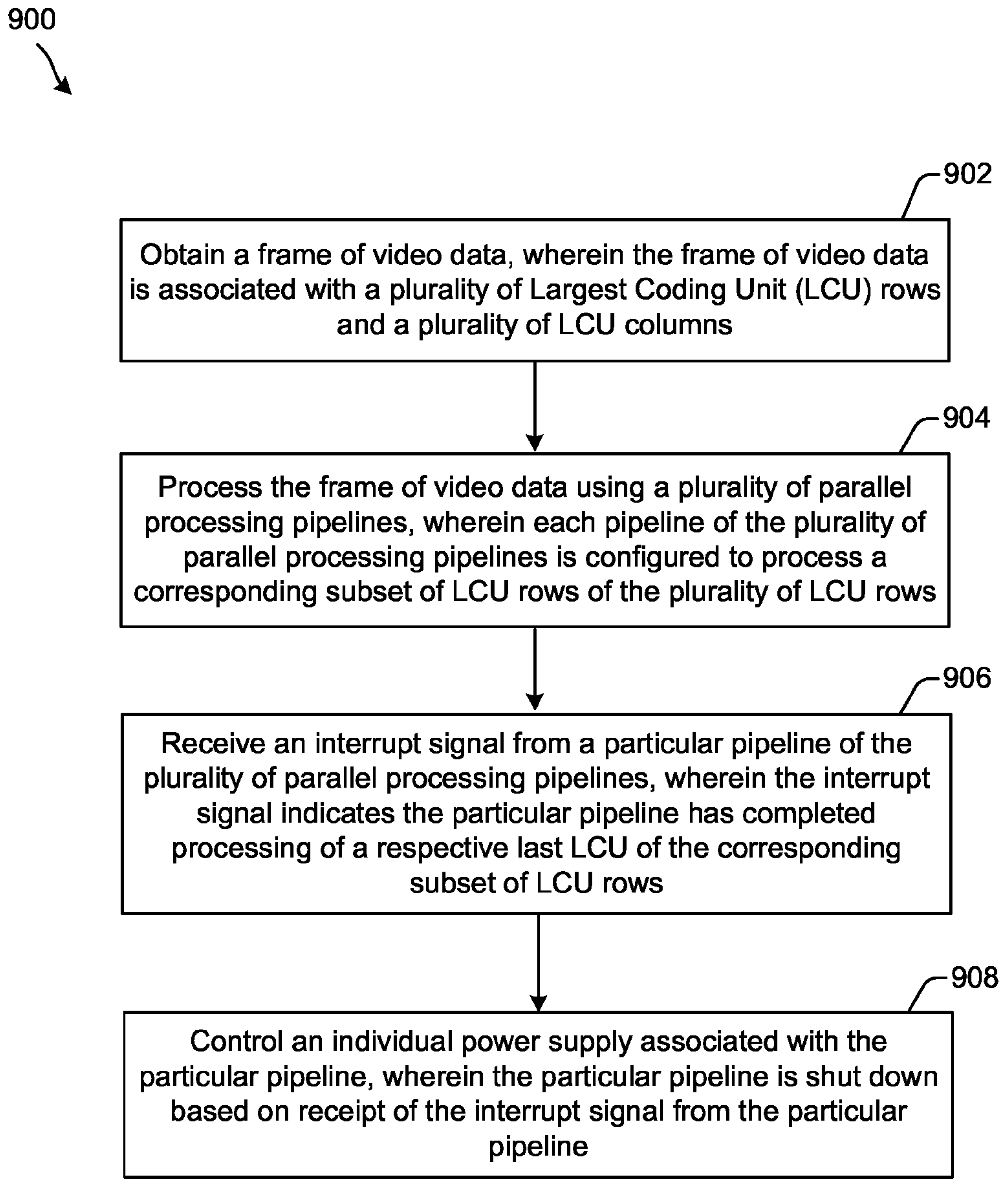
FIG. 9 is a flowchart diagram illustrating an example of a process for video coding, in accordance with some examples.

FIG. 9 is a flow diagram illustrating an example of a process 900 for processing video data, in accordance with aspects of the present disclosure. For instance, the process 900 can be performed by a computing device or apparatus or a component or system (e.g., one or more chipsets, one or more processors such as one or more CPUs, DSPs, NPUs, NSPs, microcontrollers, ASICs, FPGAs, programmable logic devices, discrete gates or transistor logic components, discrete hardware components, etc., any combination thereof, and/or other component or system) of the computing device or apparatus. The operations of the process 900 may be implemented as software components that are executed and run on one or more processors (e.g., processor 1010 of FIG. 10 or other processor(s)). In some examples, the process 900 can be performed by a video coding hardware engine, such as the video coding hardware engine 400 of FIG. 4. In some cases, the process 900 can be performed by the video coding system 500 of FIG. 5, including one or more of the video coding application software 502, the video coding firmware 504, and/or the video coding hardware 506 of FIG. 5.

At block 902, the computing device (or component thereof) can obtain a frame of video data, wherein the frame of video data is associated with a plurality of Largest Coding Unit (LCU) rows and a plurality of LCU columns. For example, the frame of video data can be obtained from the video source 102 of FIG. 1, as the output 110 of encoding device 104 of FIG. 1, as the input 114 of decoding device 112, etc. In some cases, the frame of video data can be the video data associated with the encoding device 104 of FIG. 2, the encoded video bitstream associated with the decoding device 112 of FIG. 3, etc. In some examples, the frame of video data can be obtained from the memory 440 and/or buffer(s) 432 of the video coding engine architecture 400 of FIG. 4, for example as the bitstream 436 and/or the coded data 438. In some cases, the frame of video data can be included in the bitstream 508 of FIG. 5. In some examples, the frame of video data can be the same as or similar to the frame of video data of FIG. 6, including the plurality of LCU rows 620 and the plurality of LCU columns 610. In some cases, the frame of video data can be the same as or similar to the frame of video data of FIG. 7, including the plurality of LCU rows 720 and the plurality of LCU columns 710. In some cases, the frame of video data can be the same as or similar to the frame of video data of FIG. 8, including the plurality of LCU rows 820 and the plurality of LCU columns 810.

At bock 904, the computing device (or component thereof) can process the frame of video data using a plurality of parallel processing pipelines, wherein each pipeline of the plurality of parallel processing pipelines is configured to process a corresponding subset of LCU rows of the plurality of LCU rows.

For example, the plurality of parallel processing pipelines can be the same as or similar to the parallel processing pipelines pipe 414-418 of the video coding engine architecture 400 of FIG. 4. In some cases, the plurality of parallel processing pipelines can be the same as or similar to the Pipe 0-Pipe 3 of FIGS. 6-8.

In some examples, each pipeline of the plurality of parallel processing pipelines is associated with a corresponding individually controllable power supply. In some cases, the plurality of parallel processing pipelines is included in a video codec parallel processing architecture of the apparatus. In some examples, the apparatus implements the plurality of parallel processing pipelines. In some examples, the apparatus further comprises one or more cameras configured to capture the frame of video data. In some cases, the apparatus can be configured to output an output frame comprising processed LCUs for the frame of video data, wherein the processed LCUs are generated based on using the plurality of parallel processing pipelines to process to the frame of video data.

At block 906, the computing device (or component thereof) can receive an interrupt signal from a particular pipeline of the plurality of parallel processing pipelines, wherein the interrupt signal indicates the particular pipeline has completed processing of a respective last LCU of the corresponding subset of LCU rows. In some cases, the respective last LCU is included in a last LCU row of the corresponding subset of LCU rows for the particular pipeline. In some cases, the last LCU row is a final LCU row assigned to the particular pipeline to process for the frame of video data.

For example, the interrupt signal can be the same as or similar to the interrupt signal 762 raised by Pipe 1 of FIG. 7, the interrupt signal 764 raised by Pipe 2 of FIG. 7, the interrupt signal 766 raised by Pipe 3 of FIG. 7, etc. In some cases, the interrupt signal is indicative of an idle state of the particular pipeline. In some examples, the interrupt signal indicates at least one LCU of each LCU row of the plurality of LCU rows associated with the frame of video data has been processed.

In some cases, the interrupt signal is indicative of zero unprocessed LCU rows remaining within the plurality of LCU rows at a time corresponding to the interrupt signal. For example, the interrupt signal 762 for Pipe 1 of FIG. 7 can be indicative of zero unprocessed LCU rows remaining from the plurality of LCU rows 720, at the Time 31 when Pipe 1 completes processing and raises the interrupt signal 762.

The interrupt signal 764 for Pipe 2 of FIG. 7 can be indicative of zero unprocessed LCU rows remaining from the plurality of LCU rows 720, at the Time 33 when Pipe 2 completes processing and raises the interrupt signal 764. The interrupt signal 766 for Pipe 3 of FIG. 7 can be indicative of zero unprocessed LCU rows remaining from the plurality of LCU rows 720, at the Time 35 when Pipe 3 completes processing and raises the interrupt signal 766.

In some cases, the computing device (or component thereof) can be configured to receive, from each remaining pipeline of the plurality of parallel processing pipelines other than the first pipeline, a respective interrupt signal indicative of completed LCU processing, and shut down each remaining pipeline based on receipt of the respective interrupt signal. In some examples, the computing device (or component thereof) can be configured to receive the respective interrupt signal from each remaining pipeline of the plurality of parallel processing pipelines at a different time during processing of the frame of video data.

At block 908, the computing device (or component thereof) can cause a shut down of the particular pipeline based on receipt of the interrupt signal from the particular pipeline, wherein the shut down deactivates the particular pipeline. For example, the computing device (or component thereof) can shut down Pipe 1 after the interrupt signal 762 is raised and received at Time 31 of FIG. 7, can shut down Pipe 2 after the interrupt signal 764 is raised and received at Time 33 of FIG. 7, and can shut down Pipe 3 after the interrupt signal 766 is raised and received at Time 35 of FIG. 7.

In some examples, the computing device (or component thereof) can be configured to reactivate the particular pipeline to process a corresponding subset of LCU rows of a plurality of LCU rows of an additional frame of video data, wherein the frame of video data and the additional frame of video data are consecutive frames. For example, Pipe 1 can be shut down at Time 31 after raising interrupt signal 762 after completing processing of its last respective LCU row for the first frame 700-1 of FIG. 7, and can be reactivated at Time 47 to process LCU rows within the second frame 700-2 of FIG. 7.

Pipe 2 can be shut down at Time 33 after raising interrupt signal 764 after completing processing of its last respective LCU row for the first frame 700-1 of FIG. 7, and can be reactivated at Time 49 to process LCU rows within the second frame 700-2 of FIG. 7. Pipe 3 can be shut down at Time 35 after raising interrupt signal 766 after completing processing of its last respective LCU row for the first frame 700-1 of FIG. 7, and can be reactivated at Time 51 to process LCU rows within the second frame 700-2 of FIG. 7.

In some cases, the particular pipeline remains shut down for one or more time cycles associated with processing the frame of video data and for one or more time cycles associated with processing the additional frame of video data. In some examples, the computing device (or component thereof) can be configured to control an individual power supply associated with the particular pipeline to cause the shut down of the particular pipeline.

In some cases, the computing device (or component thereof) can be configured to receive a respective interrupt signal from each pipeline of a subset of the plurality of parallel processing pipelines, and power off a respective individual power supply associated with each pipeline of the subset to cause a shut down of each pipeline of the subset based on receipt of the respective interrupt signal. In some examples, the particular pipeline remains shut down until each LCU of a plurality of LCUs included in the frame of video data has been processed. In some examples, a first pipeline of the plurality of parallel processing pipelines does not raise the interrupt signal and does not shut down during processing of the frame of video data.

In some cases, the process 900 can be performed by a decoding device (e.g., the decoding device 112 of FIG. 1 and FIG. 3). In some cases, the process 900 can be performed by an encoding device (e.g., the encoding device 104 of FIG. 1 and FIG. 2). For instance, the process 900 can include generating an encoded video bitstream including information associated with the video data. In some examples, the process 900 can include storing the encoded video bitstream (e.g., in the at least one memory of the apparatus). In some examples, the process 900 can include transmitting the encoded video bitstream (e.g., using a transmitter of the apparatus).

In some implementations, the processes (or methods) described herein can be performed by a computing device or an apparatus, such as the system 100 shown in FIG. 1. For example, the processes can be performed by the encoding device 104 shown in FIG. 1 and FIG. 2, by another video source-side device or video transmission device, by the decoding device 112 shown in FIG. 1 and FIG. 3, and/or by another client-side device, such as a player device, a display, or any other client-side device. In some examples, the processes can be performed by the video coding hardware engine 400 of FIG. 4 and/or the video coding system 500 of FIG. 5, and/or components thereof, etc. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Figure 10:
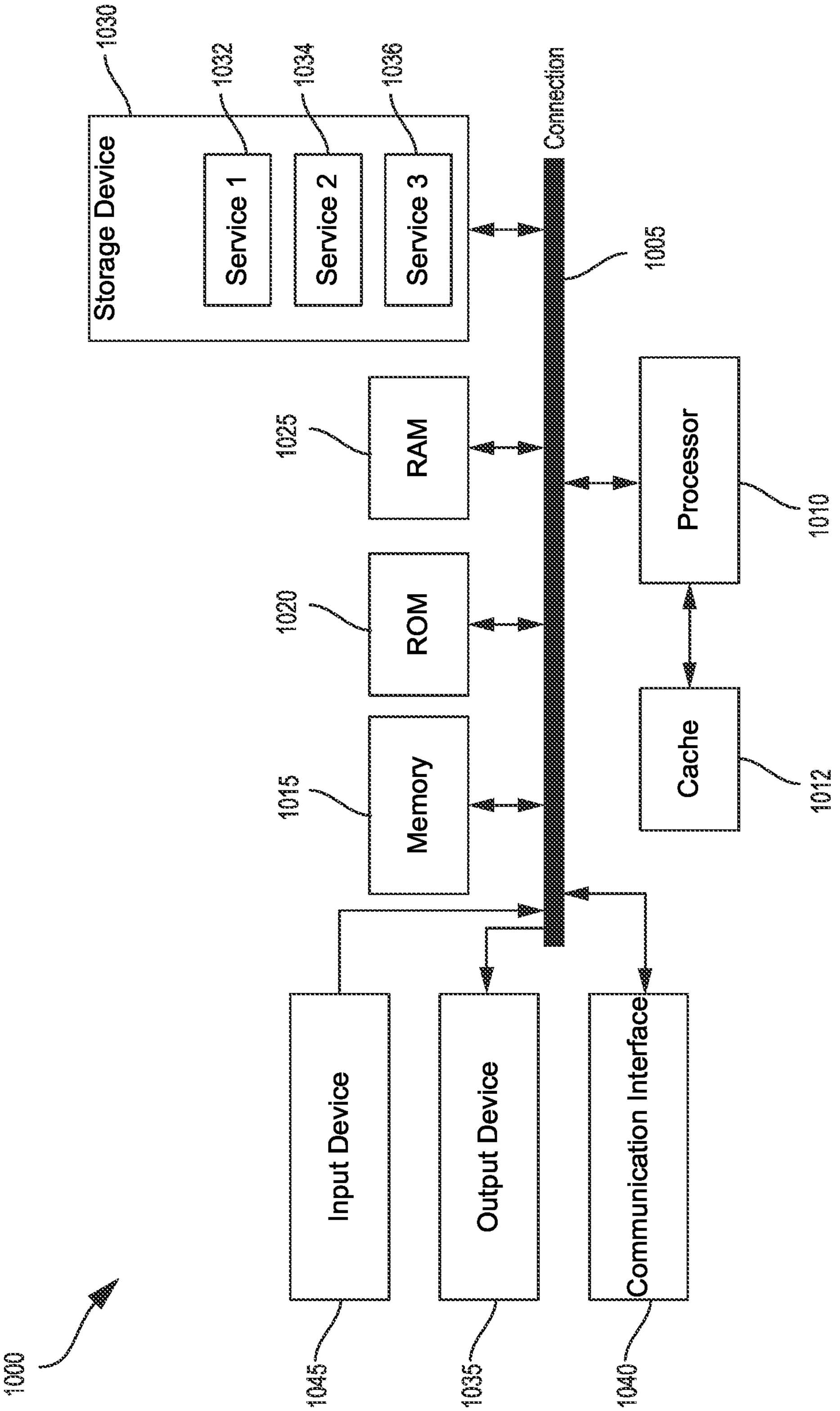
FIG. 10 is a block diagram illustrating an example of a computing system, which may be employed by the disclosed systems and techniques, in accordance with some examples.

In another example, one or more of the processes (e.g., process 900 of FIG. 9, and/or other processes described herein) can be performed, in whole or in part, by the computing-device architecture 1000 shown in FIG. 10. For instance, a computing device with the computing-device architecture 1000 shown in FIG. 10 can include, or be included in, the components of the encoding device 104 of FIG. 1 and FIG. 2, another video source-side device or video transmission device, the decoding device 112 of FIG. 1 and FIG. 3, another client-side device, such as a player device, a display, or any other client-side device, the video coding hardware engine 400 of FIG. 4, and/or the video coding system 500 of FIG. 5, etc., and can implement the operations of process 900 of FIG. 9, and/or other processes described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of a device configured to perform the process 900 of FIG. 9 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 10 illustrates an example computing-device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1000 may include, implement, or be included in any or all of the encoding device 104 of FIG. 1 and FIG. 2, another video source-side device or video transmission device, the decoding device 112 of FIG. 1 and FIG. 3, another client-side device, such as a player device, a display, or any other client-side device, the video coding hardware engine 400 of FIG. 4, and/or the video coding system 500 of FIG. 5, etc. Additionally or alternatively, computing-device architecture 1000 may be configured to perform process 900 of FIG. 9, and/or other process described herein.

The components of computing-device architecture 1000 are shown in electrical communication with each other using connection 1012, such as a bus. The example computing-device architecture 1000 includes a processing unit (CPU or processor) 1002 and computing device connection 1012 that couples various computing device components including computing device memory 1010, such as read only memory (ROM) 1008 and random-access memory (RAM) 1006, to processor 1002.

Computing-device architecture 1000 can include a cache of high-speed memory connected directly with, in close proximity to, or integrated as part of processor 1002. Computing-device architecture 1000 can copy data from memory 1010 and/or the storage device 1014 to cache 1004 for quick access by processor 1002. In this way, the cache can provide a performance boost that avoids processor 1002 delays while waiting for data. These and other modules can control or be configured to control processor 1002 to perform various actions. Other computing device memory 1010 may be available for use as well. Memory 1010 can include multiple different types of memory with different performance characteristics. Processor 1002 can include any general-purpose processor and a hardware or software service, such as service 1 1016, service 2 1018, and service 3 1020 stored in storage device 1014, configured to control processor 1002 as well as a special-purpose processor where software instructions are incorporated into the processor design. Processor 1002 may be a self-contained system, containing multiple cores or processors, a bus, memory controller, cache, etc. A multi-core processor may be symmetric or asymmetric.

To enable user interaction with the computing-device architecture 1000, input device 1022 can represent any number of input mechanisms, such as a microphone for speech, a touch-sensitive screen for gesture or graphical input, keyboard, mouse, motion input, speech and so forth. Output device 1024 can also be one or more of a number of output mechanisms known to those of skill in the art, such as a display, projector, television, speaker device, etc. In some instances, multimodal computing devices can enable a user to provide multiple types of input to communicate with computing-device architecture 1000. Communication interface 1026 can generally govern and manage the user input and computing device output. There is no restriction on operating on any particular hardware arrangement and therefore the basic features here may easily be substituted for improved hardware or firmware arrangements as they are developed.

Storage device 1014 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1006, read only memory (ROM) 1008, and hybrids thereof. Storage device 1014 can include services 1016, 1018, and 1020 for controlling processor 1002. Other hardware or software modules are contemplated. Storage device 1014 can be connected to the computing device connection 1012. In one aspect, a hardware module that performs a particular function can include the software component stored in a computer-readable medium in connection with the necessary hardware components, such as processor 1002, connection 1012, output device 1024, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("<") and greater than or equal to (">") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus to process video data, the apparatus comprising: one or more memories configured to store the video data; and one or more processors coupled to the one or more memories, the one or more processors being configured to: obtain a frame of video data, wherein the frame of video data is associated with a plurality of Largest Coding Unit (LCU) rows and a plurality of LCU columns; process the frame of video data using a plurality of parallel processing pipelines, wherein each pipeline of the plurality of parallel processing pipelines is configured to process a corresponding subset of LCU rows of the plurality of LCU rows; receive an interrupt signal from a particular pipeline of the plurality of parallel processing pipelines, wherein the interrupt signal indicates the particular pipeline has completed processing of a respective last LCU of the corresponding subset of LCU rows; and cause a shut down of the particular pipeline based on receipt of the interrupt signal from the particular pipeline, wherein the shut down deactivates the particular pipeline.

Aspect 2. The apparatus of Aspect 1, wherein the one or more processors are configured to: reactivate the particular pipeline to process a corresponding subset of LCU rows of a plurality of LCU rows of an additional frame of video data, wherein the frame of video data and the additional frame of video data are consecutive frames.

Aspect 3. The apparatus of Aspect 2, wherein the particular pipeline remains shut down for one or more time cycles associated with processing the frame of video data and for one or more time cycles associated with processing the additional frame of video data.

Aspect 4. The apparatus of any of Aspects 1 to 3, wherein the one or more processors are configured to control an individual power supply associated with the particular pipeline to cause the shut down of the particular pipeline.

Aspect 5. The apparatus of any of Aspects 1 to 4, wherein the one or more processors are configured to: receive a respective interrupt signal from each pipeline of a subset of the plurality of parallel processing pipelines; and power off a respective individual power supply associated with each pipeline of the subset to cause a shut down of each pipeline of the subset based on receipt of the respective interrupt signal.

Aspect 6. The apparatus of any of Aspects 1 to 5, wherein the particular pipeline remains shut down until each LCU of a plurality of LCUs included in the frame of video data has been processed.

Aspect 7. The apparatus of any of Aspects 1 to 6, wherein a first pipeline of the plurality of parallel processing pipelines does not raise the interrupt signal and does not shut down during processing of the frame of video data.

Aspect 8. The apparatus of Aspect 7, wherein the one or more processors are configured to: receive, from each remaining pipeline of the plurality of parallel processing pipelines other than the first pipeline, a respective interrupt signal indicative of completed LCU processing; and shut down each remaining pipeline based on receipt of the respective interrupt signal.

Aspect 9. The apparatus of Aspect 8, wherein the one or more processors are configured to receive the respective interrupt signal from each remaining pipeline of the plurality of parallel processing pipelines at a different time during processing of the frame of video data.

Aspect 10. The apparatus of any of Aspects 1 to 9, wherein the respective last LCU is included in a last LCU row of the corresponding subset of LCU rows for the particular pipeline.

Aspect 11. The apparatus of any of Aspects 1 to 10, wherein the last LCU row is a final LCU row assigned to the particular pipeline to process for the frame of video data.

Aspect 12. The apparatus of any of Aspects 1 to 11, wherein the interrupt signal is indicative of an idle state of the particular pipeline.

Aspect 13. The apparatus of any of Aspects 1 to 12, wherein the interrupt signal indicates at least one LCU of each LCU row of the plurality of LCU rows associated with the frame of video data has been processed.

Aspect 14. The apparatus of any of Aspects 1 to 13, wherein the interrupt signal is indicative of zero unprocessed LCU rows remaining within the plurality of LCU rows at a time corresponding to the interrupt signal.

Aspect 15. The apparatus of any of Aspects 1 to 14, wherein each pipeline of the plurality of parallel processing pipelines is associated with a corresponding individually controllable power supply.

Aspect 16. The apparatus of any of Aspects 1 to 15, wherein the plurality of parallel processing pipelines is included in a video codec parallel processing architecture of the apparatus.

Aspect 17. The apparatus of any of Aspects 1 to 16, wherein the apparatus implements the plurality of parallel processing pipelines.

Aspect 18. The apparatus of any of Aspects 1 to 17, further comprising one or more cameras configured to capture the frame of video data.

Aspect 19. The apparatus of any of Aspects 1 to 18, wherein the one or more processors are configured to: output an output frame comprising processed LCUs for the frame of video data, wherein the processed LCUs are generated based on using the plurality of parallel processing pipelines to process to the frame of video data.

Aspect 20. The apparatus of Aspect 19, further comprising one or more displays configured to display the output frame.

Aspect 21. A method for processing video data, the method comprising: obtaining a frame of video data, wherein the frame of video data is associated with a plurality of Largest Coding Unit (LCU) rows and a plurality of LCU columns; processing the frame of video data using a plurality of parallel processing pipelines, wherein each pipeline of the plurality of parallel processing pipelines is configured to process a corresponding subset of LCU rows of the plurality of LCU rows; receiving an interrupt signal from a particular pipeline of the plurality of parallel processing pipelines, wherein the interrupt signal indicates the particular pipeline has completed processing of a respective last LCU of the corresponding subset of LCU rows; and causing a shut down of the particular pipeline based on receipt of the interrupt signal from the particular pipeline, wherein the shut down deactivates the particular pipeline.

Aspect 22. The method of Aspect 21, further comprising: reactivating the particular pipeline to process a corresponding subset of LCU rows of a plurality of LCU rows of an additional frame of video data, wherein the frame of video data and the additional frame of video data are consecutive frames.

Aspect 23. The method of Aspect 22, wherein the particular pipeline remains shut down for one or more time cycles associated with processing the frame of video data and for one or more time cycles associated with processing the additional frame of video data.

Aspect 24. The method of any of Aspects 21 to 23, further comprising controlling an individual power supply associated with the particular pipeline to cause the shut down of the particular pipeline.

Aspect 25. The method of any of Aspects 21 to 24, further comprising: receiving a respective interrupt signal from each pipeline of a subset of the plurality of parallel processing pipelines; and powering off a respective individual power supply associated with each pipeline of the subset to cause a shut down of each pipeline of the subset based on receipt of the respective interrupt signal.

Aspect 26. The method of any of Aspects 21 to 25, wherein the particular pipeline remains shut down until each LCU of a plurality of LCUs included in the frame of video data has been processed.

Aspect 27. The method of any of Aspects 21 to 26, wherein a first pipeline of the plurality of parallel processing pipelines does not raise the interrupt signal and does not shut down during processing of the frame of video data.

Aspect 28. The method of Aspect 27, further comprising: receiving, from each remaining pipeline of the plurality of parallel processing pipelines other than the first pipeline, a respective interrupt signal indicative of completed LCU processing; and shutting down each remaining pipeline based on receipt of the respective interrupt signal.

Aspect 29. The method of Aspect 28, further comprising receiving the respective interrupt signal from each remaining pipeline of the plurality of parallel processing pipelines at a different time during processing of the frame of video data.

Aspect 30. The method of any of Aspects 21 to 29, wherein the respective last LCU is included in a last LCU row of the corresponding subset of LCU rows for the particular pipeline.

Aspect 31. The method of any of Aspects 21 to 30, wherein the last LCU row is a final LCU row assigned to the particular pipeline to process for the frame of video data.

Aspect 32. The method of any of Aspects 21 to 31, wherein the interrupt signal is indicative of an idle state of the particular pipeline.

Aspect 33. The method of any of Aspects 21 to 32, wherein the interrupt signal indicates at least one LCU of each LCU row of the plurality of LCU rows associated with the frame of video data has been processed.

Aspect 34. The method of any of Aspects 21 to 33, wherein the interrupt signal is indicative of zero unprocessed LCU rows remaining within the plurality of LCU rows at a time corresponding to the interrupt signal.

Aspect 35. The method of any of Aspects 21 to 34, wherein each pipeline of the plurality of parallel processing pipelines is associated with a corresponding individually controllable power supply.

Aspect 36. The method of any of Aspects 21 to 35, further comprising outputting an output frame comprising processed LCUs for the frame of video data, wherein the processed LCUs are generated based on using the plurality of parallel processing pipelines to process to the frame of video data.

Aspect 37. A non-transitory computer-readable storage medium comprising instructions stored thereon which, when executed by at least one processor, causes the at least one processor to perform operations according to any of Aspects 1 to 20.

Aspect 38. A non-transitory computer-readable storage medium comprising instructions stored thereon which, when executed by at least one processor, causes the at least one processor to perform operations according to any of Aspects 21 to 36.

Aspect 39. An apparatus comprising one or more means for performing operations according to any of Aspects 1 to 20.

Aspect 40. An apparatus comprising one or more means for performing operations according to any of Aspects 21 to 36.

What is claimed is:

1. An apparatus to process video data, the apparatus comprising:

one or more memories configured to store the video data; and one or more processors coupled to the one or more memories, the one or more processors being configured to:

obtain a frame of video data, wherein the frame of video data is associated with a plurality of Largest Coding Unit (LCU) rows and a plurality of LCU columns;

process the frame of video data using a plurality of parallel processing pipelines, wherein each pipeline of the plurality of parallel processing pipelines is configured to process a corresponding subset of LCU rows of the plurality of LCU rows;

receive an interrupt signal generated and transmitted from a particular pipeline of the plurality of parallel processing pipelines, wherein the interrupt signal indicates the particular pipeline has completed processing of a respective last LCU of the corresponding subset of LCU rows for the particular pipeline for the frame of video data;

cause a shut down of the particular pipeline based on receipt of the interrupt signal from the particular pipeline, wherein the shut down is based on powering off an individual power supply associated with the particular pipeline, and wherein the particular pipeline remains shut down for at least a remaining processing time of the frame of video data; and cause a shut down of each pipeline of a subset of the plurality of parallel processing pipelines based on receipt of a respective interrupt signal generated and transmitted from each pipeline of the subset based on a determination that no unprocessed LCU rows of the plurality of LCU rows for the frame of video data remain to be assigned to the respective pipeline from which the respective interrupt signal is received, and wherein the shut down of each pipeline of the subset is based on powering off a respective individual power supply associated with the respective pipeline from which the respective interrupt signal is received for at least the remaining processing time of the frame of video data.

2. The apparatus of claim 1, wherein the one or more processors are configured to:

reactivate the particular pipeline to process a corresponding subset of LCU rows of a plurality of LCU rows of an additional frame of video data, wherein the frame of video data and the additional frame of video data are consecutive frames.

3. The apparatus of claim 2, wherein the particular pipeline remains shut down for one or more time cycles associated with processing the frame of video data and for one or more time cycles associated with processing the additional frame of video data.

4. The apparatus of claim 1, wherein the one or more processors are configured to control the individual power supply associated with the particular pipeline to cause the shut down of the particular pipeline.

5. The apparatus of claim 1, wherein the one or more processors are configured to:

receive the respective interrupt signal from each pipeline of the subset of the plurality of parallel processing pipelines at a different time; and power off the respective individual power supply associated with each pipeline of the subset according to the different time at which the respective interrupt signal is received from the respective pipeline associated with the respective individual power supply.

6. The apparatus of claim 1, wherein the particular pipeline remains shut down until each LCU of a plurality of LCUs included in the frame of video data has been processed.

7. The apparatus of claim 1, wherein a first pipeline of the plurality of parallel processing pipelines does not raise the interrupt signal and does not shut down during processing of the frame of video data.

8. The apparatus of claim 7, wherein the one or more processors are configured to:

receive, from each remaining pipeline of the plurality of parallel processing pipelines other than the first pipeline and the particular pipeline, the respective interrupt signal, wherein the respective interrupt signal is indicative of completed LCU processing by the respective remaining pipeline from which the respective interrupt signal is received; and shut down each remaining pipeline based on receipt of the respective interrupt signal.

9. The apparatus of claim 1, wherein the one or more processors are configured to receive the respective interrupt signal from each pipeline of the subset at a different time during processing of the frame of video data.

10. The apparatus of claim 1, wherein the respective last LCU is included in a last LCU row of the corresponding subset of LCU rows for the particular pipeline.

11. The apparatus of claim 1, wherein the last LCU row is a final LCU row assigned to the particular pipeline to process for the frame of video data.

12. The apparatus of claim 1, wherein the interrupt signal is indicative of an idle state of the particular pipeline.

13. The apparatus of claim 1, wherein the interrupt signal indicates at least one LCU of each LCU row of the plurality of LCU rows associated with the frame of video data has been processed.

14. The apparatus of claim 1, wherein the interrupt signal is indicative of zero unprocessed LCU rows remaining within the plurality of LCU rows at a time corresponding to the interrupt signal.

15. The apparatus of claim 1, wherein each pipeline of the plurality of parallel processing pipelines is associated with a corresponding individually controllable power supply.

16. The apparatus of claim 1, wherein the plurality of parallel processing pipelines is included in a video codec parallel processing architecture of the apparatus.

17. The apparatus of claim 1, wherein the apparatus implements the plurality of parallel processing pipelines.

18. The apparatus of claim 1, further comprising one or more cameras configured to capture the frame of video data.

19. The apparatus of claim 1, wherein the one or more processors are configured to:

output an output frame comprising processed LCUs for the frame of video data, wherein the processed LCUs are generated based on using the plurality of parallel processing pipelines to process to the frame of video data.

20. A method for processing video data, the method comprising:

obtaining a frame of video data, wherein the frame of video data is associated with a plurality of Largest Coding Unit (LCU) rows and a plurality of LCU columns;

processing the frame of video data using a plurality of parallel processing pipelines, wherein each pipeline of the plurality of parallel processing pipelines is configured to process a corresponding subset of LCU rows of the plurality of LCU rows;

receiving an interrupt signal generated and transmitted from a particular pipeline of the plurality of parallel processing pipelines, wherein the interrupt signal indicates the particular pipeline has completed processing of a respective last LCU of the corresponding subset of LCU rows for the particular pipeline for the frame of video data;

causing a shut down of the particular pipeline based on receipt of the interrupt signal from the particular pipeline, wherein causing the shut down includes powering off an individual power supply associated with the particular pipeline, and wherein the particular pipeline remains shut down for at least a remaining processing time of the frame of video data; and causing a shut down of each pipeline of a subset of the plurality of parallel processing pipelines based on receipt of a respective interrupt signal generated and transmitted from each pipeline of the subset based on a determination that no unprocessed LCU rows of the plurality of LCU rows for the frame of video data remain to be assigned to the respective pipeline from which the respective interrupt signal is received, and wherein causing the shut down of each pipeline of the subset includes powering off a respective individual power supply associated with the respective pipeline from which the respective interrupt signal is received for at least the remaining processing time of the frame of video data.

* * * * *